United States Patent
Noriega

(10) Patent No.: US 9,730,098 B2
(45) Date of Patent: Aug. 8, 2017

(54) KNOWLEDGE DISCOVERY AND DATA MINING-ASSISTED MULTI-RADIO ACCESS TECHNOLOGY CONTROL

(71) Applicant: AT&T Mobility II LLC, Atlanta, GA (US)

(72) Inventor: Dimas R. Noriega, Woodstock, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 876 days.

(21) Appl. No.: 14/089,033

(22) Filed: Nov. 25, 2013

(65) Prior Publication Data

US 2015/0146549 A1    May 28, 2015

(51) Int. Cl.
H04W 24/10     (2009.01)
H04W 24/02     (2009.01)

(52) U.S. Cl.
CPC .......... *H04W 24/10* (2013.01); *H04W 24/02* (2013.01)

(58) Field of Classification Search
None
See application file for complete search history.

(56) References Cited

U.S. PATENT DOCUMENTS 4,972,473 A    11/1990  Ejiri et al.
5,159,590 A    10/1992  Hamaguchi et al.
(Continued)

FOREIGN PATENT DOCUMENTS

GB    2398711 A    8/2004
JP    0774667 A    3/1995
(Continued)

OTHER PUBLICATIONS

Giupponi, et al., "A novel joint radio resource management approach with reinforcement learning mechanisms." Performance, Computing, and Communications Conference, 2005. IPCCC 2005. 24th IEEE International, IEEE, 2005; 0-7803-8991-3/3/05/$29.00 (c)2005 IEEE; <http://www.grcm.tsc.upc.edu/sites/default/files/01460650.pdf>. Retrieved on Sep. 7, 2013, 5 pages.

(Continued)

*Primary Examiner* — Bunjob Jaroenchonwanit
(74) *Attorney, Agent, or Firm* — Amin, Turocy & Watson, LLP

(57) ABSTRACT

Joint provisioning of cell sector capacity (CSC) and a defined customer service level (CSL) is provided utilizing a knowledge discovery and data mining-assisted multi-radio access technology controller. For example, Strategic Performance Indexes, CSC and CSL, are identified. The relationships between CSC, CSL, ergodic channel capacity (ECC) and an interface load (IL) for a radio network (RN) (or cell sector of an RN) are determined. Extensive information associated with the RN is collected and neural networks analysis is employed to reduce the information to a manageable set including the specific information associated with ECC and IL. The reduced set of information is mapped to ECC and IL using eigenvalue analysis, and the relationships between the ECC, IL, CSC and CSL are employed to determine the CSC and CSL for the RN (or cell sector of the RN). Network assignments and/or parameters can be updated based on the results.

20 Claims, 24 Drawing Sheets

(56) References Cited

U.S. PATENT DOCUMENTS

| | | |
|---|---|---|
| 5,166,927 A | 11/1992 | Iida et al. |
| 5,311,421 A | 5/1994 | Nomura et al. |
| 5,432,778 A | 7/1995 | Minde et al. |
| 5,473,631 A | 12/1995 | Moses |
| 5,687,292 A | 11/1997 | Boda et al. |
| 6,594,238 B1 | 7/2003 | Wallentin et al. |
| 7,130,807 B1 | 10/2006 | Mikurak |
| 7,496,041 B2 | 2/2009 | Blevins et al. |
| 8,423,066 B2 | 4/2013 | DeLuca |
| 2006/0120518 A1 | 6/2006 | Baudino et al. |
| 2007/0008956 A1* | 1/2007 | Moran ............... H04H 20/82 370/352 |
| 2007/0064535 A1* | 3/2007 | Burnstad ............ G01V 1/36 367/73 |
| 2007/0265841 A1* | 11/2007 | Tani ................ G06N 3/0454 704/211 |
| 2010/0144363 A1 | 6/2010 | De Rosa et al. |
| 2010/0149971 A1 | 6/2010 | Noriega |
| 2010/0296474 A1 | 11/2010 | Noriega |
| 2011/0149870 A1* | 6/2011 | Yi ................... H04W 28/06 370/328 |
| 2011/0149879 A1* | 6/2011 | Noriega ........... H04W 72/1236 370/329 |
| 2012/0233103 A1 | 9/2012 | Ashrafi |
| 2012/0322499 A1 | 12/2012 | Wei et al. |
| 2013/0159408 A1* | 6/2013 | Winn ................ G06N 99/005 709/204 |
| 2013/0316722 A1* | 11/2013 | Bader ............... H04W 88/18 455/453 |
| 2014/0051416 A1* | 2/2014 | Loborg .............. H04W 24/10 455/418 |
| 2014/0270487 A1* | 9/2014 | Park ................. G06T 5/003 382/155 |
| 2015/0223135 A1* | 8/2015 | Ratasuk ............ H04W 16/32 455/436 |

FOREIGN PATENT DOCUMENTS

| | | |
|---|---|---|
| JP | 0915279 A | 1/1997 |
| JP | 1155132 A | 2/1999 |

OTHER PUBLICATIONS

Agusti, et al. "A fuzzy-neural based approach for joint radio resource management in a beyond 3G framework." Proceedings of the First International Conference on Quality Service in Heterogeneous Wired/Wireless Networks (QSHINE'04); 0-7695-2233-5/04 $20.00 (c)2004 IEEE. <http://www.grcm.tsc.upc.edu/sites/default/files/01366321.pdf>. Retrieved on Sep. 7, 2013, 9 pages.

Gomez-Barquero, et al. "Hopfield Neural Network-Based Approach for Joint Dynamic Resource Allocation in Heterogeneous Wireless Networks." Vehicular Technology Conference, 2006. VTC-2006 Fall. 2006 IEEE 64th. IEEE, 2006.<http://www.researchgate.net/publication/224761760_Hopfield_Neural_Network_-_Based_Approach_for_Joint_Dynamic_Resource_Allocation_in_Heterogeneous_Wireless_/file/9fcfd50bf8dcbbcdf8.pdf>. Retrieved on Sep. 7, 2013, 5 pages.

Cui, et al. "A novel multi-radio packet scheduling algorithm for real-time traffic on generic link layer." Communications, 2009. APCC 2009. 15th Asia-Pacific Conference on. IEEE, 2009.<http://ieeexplore.ieee.org/xpl/login.jsp?tp=&arnumber=5375675&url=http%3A%2F%2Fieeexplore.ieee.org%2Fxpls%2Fabs_all.jsp%3Farnumber%3D5375675>. Retrieved on Sep. 7, 2013, 2 pages.

\* cited by examiner

KNOWLEDGE DISCOVERY AND DATA MINING-ASSISTED MULTI-RADIO ACCESS TECHNOLOGY CONTROL

TECHNICAL FIELD

The subject disclosure relates generally to radio access technology (RAT), and specifically to facilitating monitoring and adjustment of network performance utilizing knowledge discovery and data mining (KDD)-assisted multi-RAT control, in particular.

BACKGROUND

With the onslaught of technological developments, wireless communication systems are becoming more complex. At the same time, consumers demand particular service levels from wireless communication systems. To guarantee service levels in ever-increasing complex systems typically involves monitoring and regular adjustments to the parameters associated with the system. However, the vast amount of information generated by the networks due to the large number of radio networks (RNs) in the network can make monitoring, calculating and adjustment of parameters computationally inefficient, costly and time-consuming.

DETAILED DESCRIPTION

Figure 1:
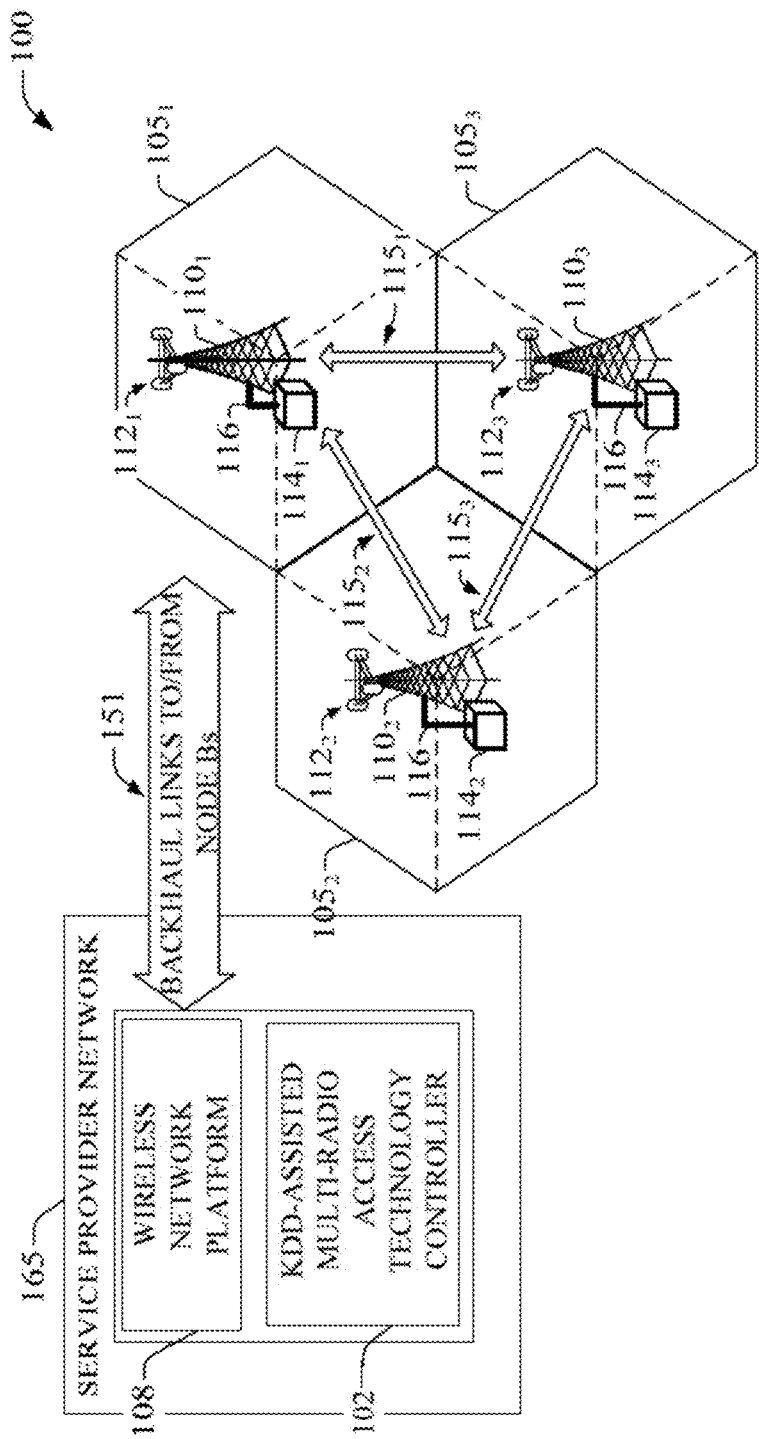
FIG. 1 illustrates an example block diagram of a system that can facilitate monitoring, computing and adjustment of network performance utilizing KDD-assisted multi-RAT control in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station, " "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," Node B, "evolved Node B (eNodeB)," "home Node B (HNode B)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

With the onslaught of technological developments, wireless communication systems are becoming more complex. At the same time, consumers demand particular service levels from wireless communication systems. To guarantee service levels in ever-increasing complex systems typically involves monitoring and regular adjustments to the parameters associated with the system. However, the vast amount of information generated by the networks due to the large number of RNs in the network can make monitoring and adjustment of parameters computationally inefficient, costly and time-consuming. As used herein, the term "RN" represents radio networks, which can also be referred to and/or include the structure and/or functionality of a "radio node."

Further, network resources are scarce and costly to acquire from both a regulatory and an economical perspective. Availability of portions of the spectrum of electromagnetic radiation employed to transport wireless signals, and power allowances for communication of such signals, are highly regulated. Development and deployment of new radio technologies that more efficiently exploit available network resources requires substantive financial commitment from telecommunication carriers. Thus, optimal allocation of network resources is paramount to the commercial viability of telecommunication carriers since a lower cost of operation may translate into better rates and the corresponding ability to obtain and maintain customers.

Additionally, different radio layers (e.g., LTE and wireless local area network (WLAN)) adjust performance in a local manner, which may not lead to overall network capacity. Ideally, systems will attempt to minimize the quantity of the spectrum resources used while also providing a satisfactory end customer experience. These criteria should be balanced and met.

In the embodiments described herein, a KDD-assisted multi-RAT controller can provide real-time monitoring, computation and/or adjustment for improved network performance while meeting demands of end customers. In various embodiments, the KDD-assisted multi-RAT controller can be deployed in or in association with major communication centers for monitoring, computation and/or adjustment of parameters associated with RNs in the region of the communication center; and/or prediction of forthcoming changes in network conditions. Further, in some embodiments, KDD-assisted multi-RAT controller, and/or the systems or methods described in association with, can be employed in self-optimizing network (SON) or network planning environment if time scales are selected properly.

In one embodiment, a method includes determining, by a device including a processor, a set of records including counters associated with performance of an RN device (e.g., eNode B). The method can also include identifying, by the device, utilizing pattern recognition, information indicative of a subset of the set of records that represents performance of the RN device. In some embodiments, each record can have multiple counters. Further, an optimal subset of counters can be employed for characterization of performance of the RN device. The determination of which subset of counters is optimal can be dependent on the specific hardware and/or software of the RN device.

In another embodiment, a computer-readable storage device stores computer-executable instructions that, in response to execution, cause a device comprising a processor to perform operations. The operations include determining first information indicative of counters for an RN device (e.g., eNode B), wherein the determining is based on removing second information satisfying a defined condition from third information indicative of the counters, and wherein the second information is identified by performing a neural network analysis. The operations also include computing an ergodic channel capacity for the RN device and an interface load for the RN device based on the first information.

In some embodiments, exploratory data analysis and/or data mining techniques can be generally employed to identify the second information. Exploratory data analysis can include methods using descriptive statistical techniques to describe the structure and/or relationships present in a set of data/information/measurements. Data mining can include descriptive and inferential methods to produce decision rules based on the structures and/or models that describe a set of data/information/measurements. Examples of data mining include, but are not limited to, neural network analysis and machine learning analysis.

In another embodiment, an apparatus includes: memory to store executable instructions; and a processor, coupled to the memory, that facilitates execution of the executable instructions to perform operations. The operations include: determining a joint condition for a radio network device, wherein the joint condition is associated with a performance requirement for the radio network device; and accessing a first set of counters for the radio network device, wherein the first set of counters is associated with the joint condition for the radio network device. The operations also include: employing pattern recognition to reduce the first set of counters to a second set of counters, wherein the second set of counters is associated with the joint condition for the radio network device; and determining a factor associated with the joint condition, wherein the determining is based on the second set of counters.

One or more embodiments described herein can advantageously improve network performance (e.g., spectral efficiency and/or bit rate per user), controllability and/or predictability.

Turning now to the drawings, FIG. 1 illustrates an example block diagram of a system that can facilitate monitoring and adjustment of network performance utilizing KDD-assisted multi-RAT control in accordance with one or more embodiments described herein. In the embodiment shown, system 100 includes one or more RNs $105_\lambda$ electrically and/or communicatively coupled to service provider network 165. As shown, service provider network 165 can include wireless network platform 108 configured to provide wireless communication services and KDD-assisted multi-RAT controller 102. As also shown, in some embodiments, RNs $105_\lambda$ can be electrically and/or communicatively coupled to service provider network 165 (and, correspondingly, wireless network platform 108 and/or KDD-assisted multi-RAT controller 102) via backhaul link 151.

While system 100 includes only RNs $105_1$-$105_3$, in various embodiments system 100 can include numerous RNs (e.g., $10^5$ RNs). Additionally, RNs $105_1$-$105_3$ can represent cells of any size (e.g., macro cells, femto cells). Further, while RNs $105_1$-$105_3$ are shown in association with hexagonal geometries, in other embodiments, RNs $105_1$-$105_3$ can adopt other geometries, which can be dictated by deployment configuration, floor plan, geographic areas to be covered or any number of other factors.

In various embodiments, RN $105_\lambda$ can be sectorized in a $2\pi/3$-radians central angle configuration in which each RN $105_\lambda$ includes three sectors, which are demarcated with dashed lines in FIG. 1. While the embodiments illustrate sectorization in a $2\pi/3$-radians central angle configuration, in other embodiments, other sectorizations are possible, and embodiments or features of the subject disclosure can be exploited regardless of type of sectorization. In various embodiments, radio components $114_1$, $114_2$, $114_3$ can be coupled through links 116 such as cables (e.g., radio frequency (RF) and microwave coaxial lines), ports, switches, connectors, and the like, to a set of one or more antennas $112_1$, $112_2$, $112_3$ configured to transmit and/or receive wireless signals.

RNs $105_1$, $105_2$, $105_3$ can be served by eNode Bs $110_1$, $110_2$, $110_3$, respectively and associated respective radio components $114_1$, $114_2$, $114_3$. An example component of eNode Bs $110_1$, $110_2$, $110_3$ can include the structure and/or functionality described with reference to FIG. 2.

Figure 2:
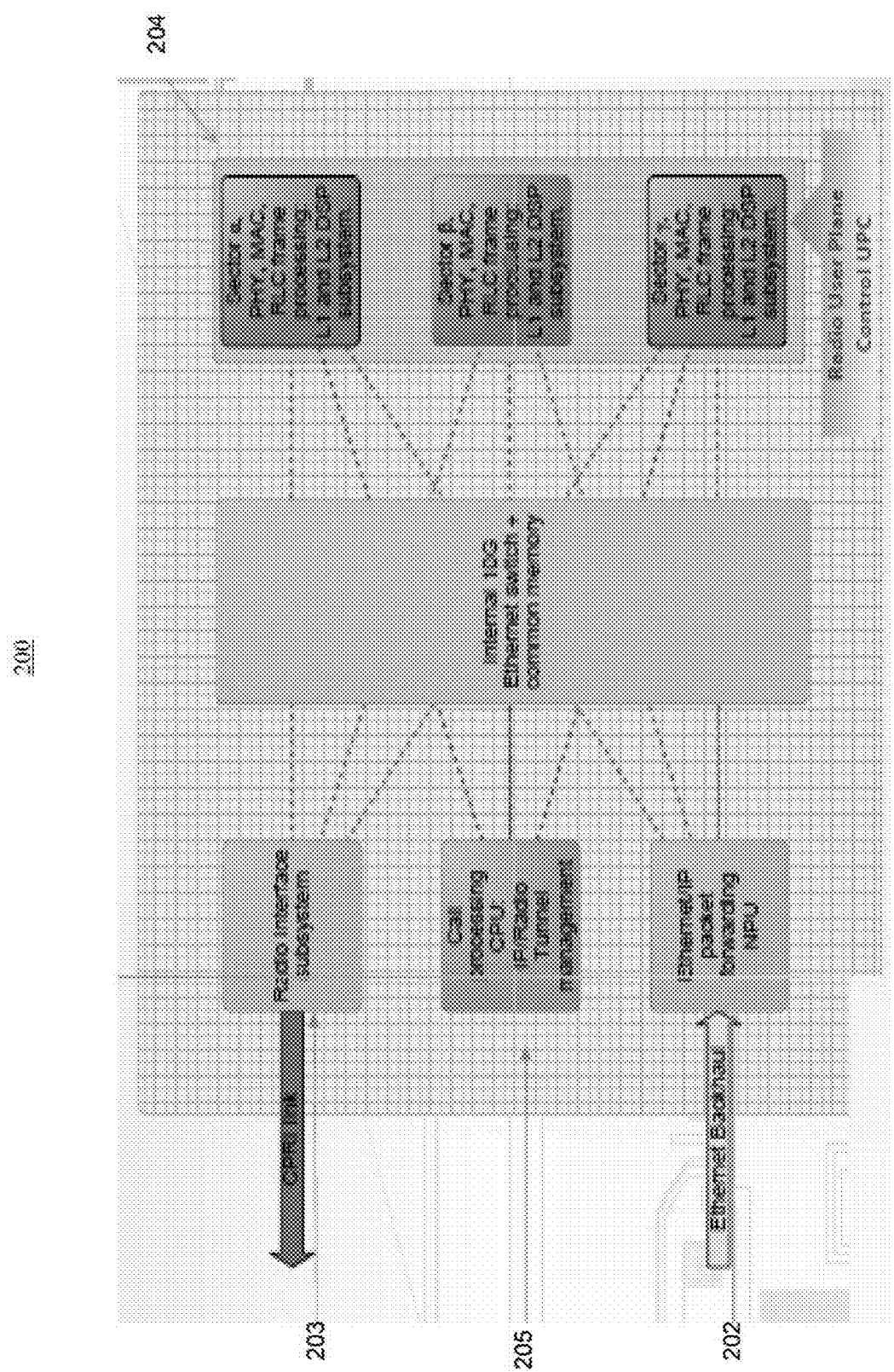
FIG. 2 illustrates an example block diagram of architecture for a portion of an eNode B associated with an RN for which monitoring and adjustment of network performance utilizing KDD-assisted multi-RAT control can be facilitated in accordance with one or more embodiments described herein.

FIG. 2 illustrates an example block diagram of architecture for a portion of an eNode B (e.g., eNode B $110_1$) associated with an RN for which monitoring and adjustment of network performance utilizing KDD-assisted multi-RAT control can be facilitated in accordance with one or more embodiments described herein. In some embodiments, the eNode B for which architecture 200 is shown can be built with or electrically or communicatively coupled to a high performance switch-router.

In the embodiment shown, architecture 200 includes transport interface subsystem 202, radio interface subsystem 203, L1/L2 (radio) subsystem 204 and IP/radio tunnel management subsystem 205. In various embodiments, one or more of transport interface subsystem 202, radio interface subsystem 203, L1/L2 (radio) subsystem 204 and/or IP/radio tunnel management subsystem 205 can be electrically and/or communicatively coupled to one another to perform one or more functions described with reference to architecture 200 of eNode B. Transport interface subsystem 202, radio interface subsystem 203 and/or L1/L2 subsystem 204 can be integrated into a single printed circuit board (PCB) or a plurality of PCBs in a multiple board chassis configuration.

As shown, transport interface subsystem 202 can include an Ethernet/IP packet forwarding network processor unit (NPU). In this embodiment, transport interface subsystem 202 can be or include an Ethernet/Internet Protocol (IP) subsystem and can include the IPSec protocol.

IP/radio tunnel management subsystem 205 can include a call processing central processor unit (CPU) and/or can provide IP/radio tunnel management. Radio interface subsystem 203 can be electrically and/or communicatively coupled to a common public radio interface (CPRI) link in some embodiments. L1/L2 (radio) subsystem 204 can include physical, media access control (MAC), radio link control (RLC) processing and/or an L1 and L2 digital signal processor (DSP) subsystem for one or more sectors associated with the eNode B. In some embodiments, radio user plane control (UPC, Data Path Control) is provided via the L1 and L2 (radio) subsystem 204.

Accordingly, functionality provided by architecture 200 can include receipt of Ethernet/IP packets to/from the backhaul via transport interface subsystem 202 and/or processing of the Ethernet/IP packets (employing L1/L2 (radio) subsystem 204) for efficient forwarding as radio frames over a wireless medium via the radio interface subsystem 203.

In various embodiments, transport interface subsystem 202 (i.e., Ethernet/IP subsystem), radio interface subsystem 203 and 204 can be considered the user plane (or data path) subsystem while the call processing CPU associated with the IP/radio tunnel management subsystem 205 can be considered the control plane. In some embodiments, the call processing CPU can concatenate the per user Ethernet/IP tunnels arriving to transport interface subsystem 202 and/or map to per user radio tunnels departing to the wireless medium via radio interface subsystem component 203. Radio tunnels can be based on the RLC protocol working in conjunction with the MAC layer.

Transport interface subsystem 202 and/or L1/L2 subsystem 204 (or information or counters generated therefrom) can be monitored, analyzed and/or characterized by KDD-assisted multi-RAT controller 102 to determine the cell sector capacity for the RN and/or whether a defined customer service level can be provided in the cell sector for the RN. For example, information/measurements associated with, and the operation of, L1/L2 subsystem 204 can be employed to characterize the system ergodic channel capacity. In some embodiments, the system can be an LTE system and, as such, information/measurements associated with, and the operation of, L1/L2 subsystem 204 can be employed to characterize LTE ergodic channel capacity.

With reference to FIGS. 1 and 2, radio interface subsystem 203 can provide the interface between the eNode B (e.g., eNode B $110_1$) and one or more mobile devices in an RN (e.g., RNs $105_1$).

L1 and L2 subsystem 204 can include structure and/or functionality of a baseband modem and/or can be executed by digital signal processor (DSP), application specific integrated circuit (ASIC) and/or a field programmable gate array (FPGA). L1 and L2 subsystem 204 can provide radio resource management (RRM) as instructed by the control plane subsystem.

In some embodiments, L1 and L2 subsystem 204 can schedule radio frames forwarding to/from the radio interface. Scheduling radio frames to/from the radio interface in an optimal manner can be executed by the UPC. In various embodiments, the UPC scheduler task can perform radio frame forwarding using RLC/hybrid automatic repeat request (HARQ) tunnels and/or by computing optimal modulation and coding scheme (MCS)/transport block size (TBS) information that maximizes the quantity of user information bits (UIB) per physical resource block (PRB) (collectively, "UIB/PRB"). The optimized cell sector capacity then can be allocated to the specific bit rate demanded by the active radio tunnel. The ratio of user information bits/total bits can be influenced by a number of factors including, but not limited to, cell noise plus interference (N+I), propagation loss, user mobility patterns, users in the cell or the like. With particular technologies (e.g., WiMax and LTE), a UPC scheduler can perform scheduling at high speeds (e.g., 1 millisecond (ms)). As a result, the L1/L2 subsystem 203 UPC is typically the bottleneck in a 4G RN.

In some embodiments, UIB/PRB can be represented by a random variable distributed according to a gamma distribution. The ergodic channel capacity can be defined as the UIB/PRB*PRB/second, which has bits/second units, as expected. If the radio layer block error rate (BLER) is zero, the ergodic channel capacity is (or is approximately) equivalent to the layer bandwidth in megabytes per second (Mbps). Further, the mean value for the random variable representing the UIB/PRB can be proportional to the spectral efficiency.

As the technology evolves, the bottleneck may shifts to another subsystem. For example, if the subsystems shown in architecture 200 are loaded into a common multi-core pool, then an IPSec subsystem may become the bottleneck. Also, a deliberate choice of a constrained backhaul can shift the bottleneck outside the eNode B. Nonetheless, various embodiments of the techniques presented herein are applicable to discover the system bottleneck and related optimal control variables. Further, employing the current framework, in the embodiments described herein, the interface utilization of eNode B $110_1$ can be correlated to the L1/L2 subsystem 204 measurements.

Accordingly, KDD-assisted multi-RAT controller 102 can receive measurements to describe the status of the interface load and the status of the ergodic channel capacity by tracking L1/L2 subsystem 204 and Ethernet/IP interface subsystem 202, respectively. Further, based on current network measurements processed via neural network methods, for example, KDD-assisted multi-RAT controller 102 can identify key metrics and perform dimensionality reduction to reduce or eliminate extraneous metrics/information to provide the ergodic channel capacity on a per RN basis. The information can be mapped, using eigenvalue analysis, to particular eNode B transport interface subsystem 202, radio interface subsystem 203 and/or L1/L2 subsystem 204 utilization ratio, normalized load, and ergodic channel capacity information. In some embodiments, the transport interface subsystem 202, radio interface subsystem 203 and/or L1/L2 subsystem 204 utilization, and/or ergodic channel capacity information can be employed to determine instantaneous cell sector residual, unused, capacity. In some embodiments, the load for transport interface subsystem 202, radio interface subsystem 203 and/or L1/L2 subsystem 204, and/or ergodic channel capacity information can be employed to determine whether one or more requirements from a new arriving call (e.g., bit rate requirements) can be met in a particular cell sector of the RN and/or whether re-direction to another radio layer should be performed.

In some embodiments, with reference to FIGS. 1 and 2, KDD-assisted multi-RAT controller 102 can iteratively provide cell sector capacity and/or determine whether defined customer service levels can be met across one or more (or all) RNs and/or technologies within network 100 to improve and/or optimize overall spectral efficiency across network 100.

Turning back to FIG. 1, in various embodiments, network 102 can facilitate Guaranteed Bit Rate (GBR) and non-GBR (e.g., packet-switched (PS)-based/internet protocol (IP), frame relay) traffic and signaling generation, and delivery and reception, for networked telecommunication in accordance with various radio technologies. In various embodiments, GBR traffic can include voice and video interactive calls, while non-GBR-based traffic can include data associated with IP-based applications such as File Transfer Protocol (FTP) server-client suites, web browsers, video streaming, or the like.

In various embodiments, network 102 can utilize various frequency bands, or carriers, which include electromagnetic (EM) frequency bands licensed by the service provider, or service provider network 165 (e.g., personal communication services (PCS), advanced wireless services (AWS), general wireless communications service (GWCS)), and unlicensed frequency bands (e.g., 2.4 gigahertz (GHz) industrial, medical and scientific (IMS) band or one or more of the 5 GHz set of bands). In addition, network 102 can control and manage eNode Bs $110_i$ and radio components $114_i$ associated with eNode Bs $110_i$ in disparate RNs $105_i$ via, for example, a wireless network management component (e.g., KDD-assisted multi-RAT controller 102, a radio network controller, cellular gateway node or associated serving node). Similarly, wireless network platform 108 can control and/or manage radio components $114_i$ in distributed antenna systems (DASs). Moreover, wireless network platform 108 can integrate disparate network technologies (e.g., femto cell networks, Wi-Fi networks, broadband networks, service networks, enterprise networks), and associated components or infrastructure. In cellular wireless technologies (e.g., 3rd Generation Partnership Project (3GPP) Universal Mobile Telecommunication System (UMTS), Global System for Mobile Communication (GSM)), wireless network platform 108 can be embodied in a core network and a set of radio network controllers.

Wireless backhaul link 151 can include wired link components including, but not limited to, a T1/E1 phone line, a synchronous or asynchronous digital subscriber line (DSL), an asymmetric DSL (ADSL), an optical fiber backbone, a coaxial cable. In various embodiments, wireless backhaul link 151 can include, but is not limited to, a wireless link component such as line-of-sight (LOS) or non-LOS link, which can include terrestrial air-interfaces or deep space links (e.g., satellite communication links for navigation). In an Evolved Packet System (EPS) network, backhaul link 151 can be embodied as a S1/X2 interface. Backhaul measurements can be provided by a TWAMP system as a complement to the counters generated by the RN Ethernet/IP component 202. TWAMP measurements may provide a subsecond resolution.

As described with reference to FIG. 2, KDD-assisted multi-RAT controller 102 can be configured to access or retrieve measurements, counter records, for one or more cell sectors of an RN indicative of performance associated the eNode B of RN $105_i$ (or a cell sector of RN $105_i$) and apply data mining analysis (e.g., neural network analysis) or exploratory data analysis to reduce the number of counter per record to track a manageable number. KDD-assisted multi-RAT controller 102 can then map information from the remaining counters to the ergodic channel capacity and/or component utilization for the RN $105_i$ to determine the cell sector capacity and/or customer service level (e.g., throughput) provided to mobile devices in RN $105_i$. KDD-assisted multi-RAT controller 102 can perform such analysis in an ongoing basis and must perform such analysis upon notification of a change in software, hardware associated with an RN $105_i$ and/or after any migration or change in technology (e.g., new LTE, new WiMax layer) in the RN $105_i$.

In various embodiments, network 102 can be partitioned into segments with each segment being monitored by a KDD-assisted multi-RAT controller (e.g., KDD-assisted multi-RAT controller 102). Accordingly, KDD-assisted multi-RAT controller 102 may be assigned to monitor 1,000-5,000 RNs instead of 100,000 RNs. Since each RN is typically monitored every few seconds, however, monitoring 1,000-5,000 RNs records, each record composed of thousands of counters, is nonetheless computationally inefficient.

The performance of an RN is indicated by counters associated with the RNs. Typically, up to 1000 counters can be monitored per RN. However, KDD-assisted multi-RAT controller 102 can employ data mining and/or exploratory data analysis to identify a subset of the total set of counters for monitoring such that the result of monitoring is the same or similar to the results obtained if KDD-assisted multi-RAT controller 102 monitored the entire set of counters for an RN. For example, 5-10 counters can be identified by KDD-assisted multi-RAT controller 102 in lieu of KDD-assisted multi-RAT controller 102 monitoring 1,000 counters per RN.

Figure 3:
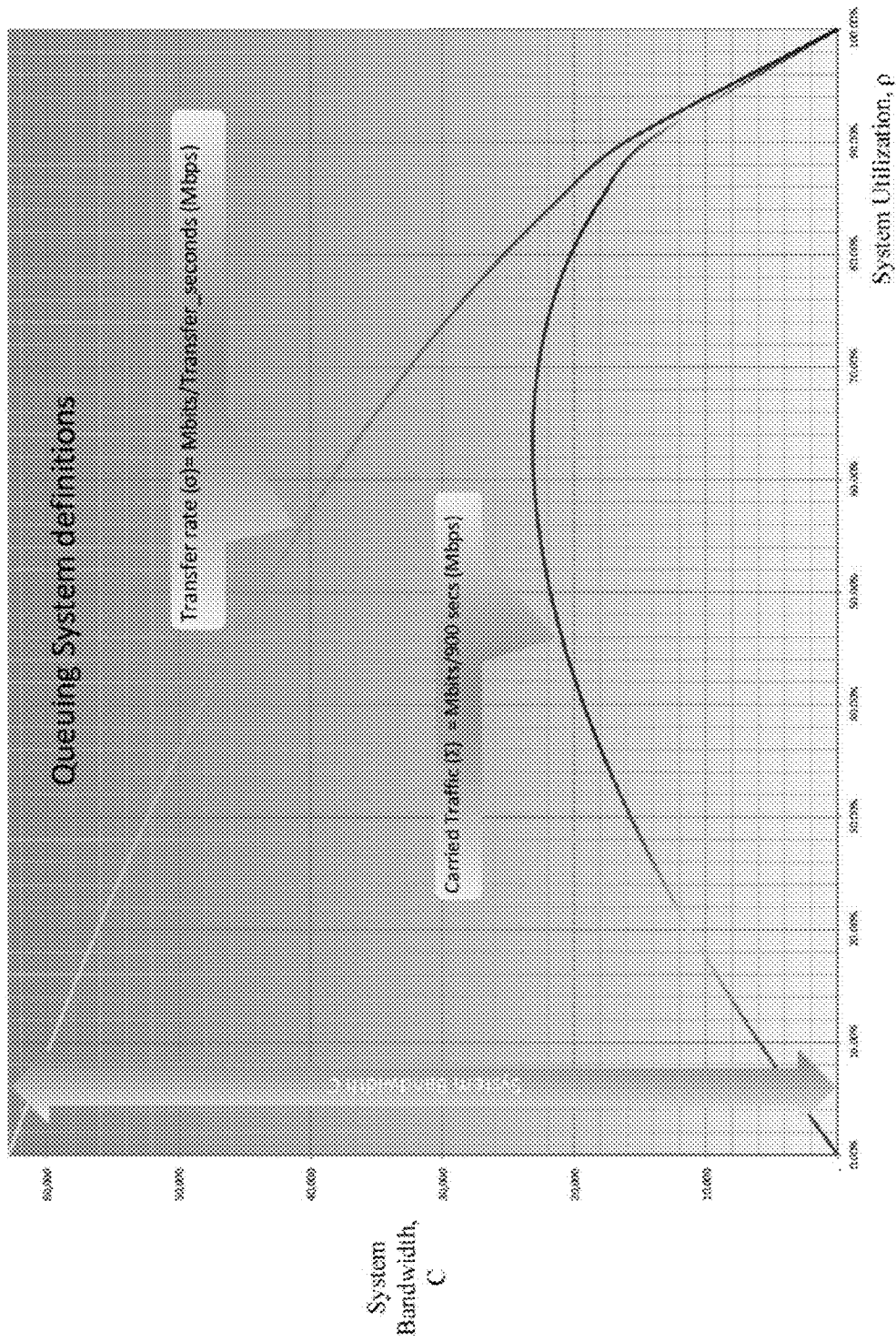
FIG. 3 illustrates an example graph depicting relationships between various parameters for defining queuing metrics employed by a KDD-assisted multi-RAT controller in accordance with one or more embodiments described herein.

FIG. 3 illustrates an example graph depicting relationships between various parameters for defining queuing metrics employed by a KDD-assisted multi-RAT controller in accordance with one or more embodiments described herein. In this disclosure, queuing metrics can also be considered or referred to as SPI (Strategic Performance Indicators) due to the wide impact on the network cost and service quality.

With reference to FIGS. 2 and 3, various parameters can be evaluated to define capacity metrics for transport interface subsystem 202, radio interface subsystem 203 and/or L1/L2 subsystem 204 employed in accordance with one or more embodiments described herein. In particular, FIG. 3 illustrates the relationships between capacity, C, utilization, ρ, throughput, Σ, and transfer rate σ of transport interface subsystem 202, radio interface subsystem 203 and/or L1/L2 subsystem 204 (or a component of transport interface subsystem 202, radio interface subsystem 203 and/or L1/L2 subsystem 204). The transfer rate is commonly used as a customer experience metric while the throughput is used as a metric to determine the efficiency of one or more of transport interface subsystem 202, radio interface subsystem 203 and/or L1/L2 subsystem 204 (or a component of transport interface subsystem 202, radio interface subsystem 203 and/or L1/L2 subsystem 204).

In one embodiment, the relationships shown in FIG. 3 are associated with a scenario in which the component can be modeled as a router with a weighted fair queuing (WFQ) policy, with C representing the interface port bandwidth and ρ representing the router engine forwarding load. In this embodiment, it is assumed that C and ρ are independent. C can be associated with or equivalent to the Ethernet Virtual Circuit eVC peak information rate.

For radio networks (e.g., LTE/UMTS networks), the channel capacity, C, can depend on the system load, ρ, due to the mutual radio interference. Further, the ergodic channel capacity concept can be employed to characterize a wireless system. In a wireless system, the Capacity can be modeled through the ergodic channel capacity to account for the instantaneous bandwidth fluctuations induced by the radio propagation, movement and mutual interference of users.

In various embodiments, the relationships shown in FIG. 3 can result from an analysis performed in a component of transport interface subsystem 202, radio interface subsystem 203 and/or L1/L2 subsystem 204 of the eNode B to determine the utilization (or per cell-sector interface load) at a busy time period, at an actual time period at which the measurement is taken and/or employing a forecast of interface load in the future.

In some embodiments, maximized carried cell sector carried traffic, $\Sigma$, can be determined subject to a minimum user experience, a. Cell sector carried traffic, $\Sigma$, and minimum user experience can each be specified in Mbps in some embodiments. User experience, $\sigma$, can be quantified in terms of the defined customer service level required or desired to be provided in the RN cell sector. In some embodiments, the maximization can remain valid as RN operational conditions evolve. In other embodiments, KDD-assisted multi-RAT controller 102 can perform analysis iteratively when RN software and/or hardware changes, and/or technology changes, occur.

In FIG. 3, the x axis is the system utilization, $\rho$. The system utilization can be a normalized load in some embodiments. Also, in FIG. 3, $\sigma$ is the transfer rate, which is akin to the expected user experience/metric defining customer service experience/customer service level. The variable, $\Sigma$, is the average carried traffic in Mbps. The pattern recognized from FIG. 3 is that as the utilization increases the transfer rate degrades but the carried traffic increases up to a certain utilization threshold. Also, as the utilization decreases the transfer rate improves.

In some embodiments, for an eNode B, $\rho$ can represent the system utilization for a component of L1/L2 subsystem 204. The system utilization can also be considered the UPC utilization or transmission time interval (TTI)) utilization in various embodiments. Also, $\Sigma$ can represent the throughput, or carried traffic, in Mbps, for a component of L1/L2 subsystem 204. In the embodiment shown, $\Sigma$ represents the average carried traffic. Noting that wireless operators measure radio capacity by the amount of Mbps carried, the average link carried traffic, $\Sigma$, can also equal the cell sector capacity in Mbps.

As such, in various embodiments, $\Sigma$ can have the relationship with $\rho$ and $\sigma$ shown in Equation 1:

$$\Sigma = \rho \sigma. \qquad \text{(Equation 1)}$$

As shown in FIG. 3, as $\rho$ approaches 100%, downlink transfer rate approaches 0, and downlink throughput (DL T-put) is approximately equal to the transfer rate. Further, as $\rho$ approaches 0, the transfer rate approaches the channel capacity, or bandwidth, C, and the average link carried traffic, $\Sigma$, approaches 0. As shown, the average link carried traffic, $\Sigma$, has a maximum value at $\rho$ approximately equal to 0.63, which is the target operating point (TOP) if no constraints are imposed to the transfer rate value. The goals of the embodiments described herein can be to maximize $\Sigma$ (i.e. minimize network cost) while meeting a required expected user experience level, transfer rate $\sigma$.

FIG. 3 also shows the relationship between variables $\sigma$, $\Sigma$, $\rho$, and C. In some embodiments, the transfer rate can be defined using the bulk transfer capacity (BTC) RFC 3148. For example, the BTC can be the expected long-term average data rate, in bits per second, of a single ideal transmission control protocol (TCP) implementation over a particular path of interest. Accordingly, in some embodiments, BTC can equal the data sent divided by the elapsed time, in which the data sent represents unique data bits transferred (not including header bits or emulated header bits). Since BTC is a widely used customer experience/satisfaction benchmark for packet networks, in some embodiments, it is desirable to extend the applicability beyond the TCP protocol to also encompass data flows that rely on the user datagram protocol (UDP). Further, as used herein, $E(BTC_i)=\gamma$, the expected value of all the $BTC_i$ routed by an eNode B is $\gamma$.

In various embodiments, to estimate a reliable average (population) $\gamma$, statistical sampling methods are employed. Hence a $\gamma$, data rate realization, can be represented by the ratio shown in Equation 2 below:

$$r_k(t) = V_k / S_k \qquad \text{(Equation 2)}$$

where $V_k$ represents the volume, in bytes, of the kth transfer request; $S_k$ represents the transfer time of the kth transfer; and $r_k(t)$ represents the transfer rate for the kth transfer at time t with $r_k(t)$, $V_k$ and $S_k$ being realizations for the random variables r, V and S, respectively.

The transfer rate for an RN can be defined by calculating the average BTC—$r_k(t)$—over all transfers at the RN level. The transfer rate definition is shown in Equation 3 below:

$$\gamma := \lim_{n \to \infty} \left[ \left(\frac{1}{n}\right) \cdot \sum_{k=1}^{\infty} \left(\frac{V_k}{S_k}\right) \right] \qquad \text{(Equation 3)}$$

In some embodiments, Equation 3 is equivalent to the transfer rate shown in Equation 4 below, using the random variables V and S:

$$\gamma := E\left(\frac{V}{S}\right) \qquad \text{(Equation 4)}$$

A close analytical solution for Equation 4 is not known. Furthermore, the extensive processing power and/or memory requirements to collect the dataset to compute the above expression can make such computation inefficient or expensive. In some system, RNs can provide counters to build the statistical distribution of $\gamma$, the probability density function (pdf). The distribution of $\gamma$ can be calculated by counting the number of data rate realizations within a predefined Mbps range. The distribution can be used to calculate the transfer rate statistics.

In some embodiments, Equation 4 can be simplified by assuming that $V_k$ and $S_k$ are statistically independent, thereby generating Equations 5, 6, 7 and 8 shown below:

$$\theta := \frac{E(V)}{E(S)} \qquad \text{(Equation 5)}$$

$$\theta = \frac{\left(\sum_1^N V_k\right)/N}{\left(\sum_1^N S_k\right)/N} \qquad \text{(Equation 6)}$$

$$\theta = C * (1 - \rho) \qquad \text{(Equation 7)}$$

$$\theta = \text{eNode } B\_\text{Total\_Bits Transferred/Total Transfer Time} \qquad \text{(Equation 8)}$$

In embodiments in which the RN does not provide counters to track $\gamma$, $\theta$ can be used to build an approximation for the transfer rate, with $\theta \leq \gamma$.

In some embodiments, the transfer rate can be defined alternatively as time average bandwidth share per ongoing transfer, averaged over those times when there is an ongoing transfer, denoted by σ. σ provides an upper bound for γ, θ<γ<σ. Further, in some embodiments, σ can be calculated analytically for the processor sharing queue of bandwidth, C, subject to a load ρ. In this embodiment, C represents the link capacity (in Megabits per second). Equation 9 can be as shown below and in FIG. 3.

$$\sigma = \frac{C((1-\rho))\ln\left(\frac{1}{(1-\rho)}\right)}{\rho} \quad \text{(Equation 9)}$$

If the component for transport interface subsystem 202, radio interface subsystem 203 and/or L1/L2 subsystem 204 does not track the individual $BTC_i$, σ can be estimated as follows:

$$\sigma = \frac{\theta * \ln\left(\frac{1}{(1-\rho)}\right)}{\rho} \quad \text{(Equation 10)}$$

$$\rho = UPC \text{ utilization} \quad \text{(Equation 11)}$$

With regard to Equations 10 and 11, the ergodic channel capacity is no longer explicit, but still implicitly accounted for by θ. In some embodiments, the system utilization, ρ, can be approximated as the amount of time the component for transport interface subsystem 202, radio interface subsystem 203 and/or L1/L2 subsystem 204 is in use. Further, in some embodiments, Equations 12 and 13 can result:

$$\rho = (\text{used } TTI/\text{Total\_TTI}) = TTI \text{ Erlangs} \quad \text{(Equation 12)}$$

$$\sigma = \frac{(\text{eNodeB\_Total\_bits\_transferred}) * \ln((1/(1 - \text{Used\_TTI}/\text{Total\_TTI}))}{(\text{Total\_Transfer\_time}) * (\text{Used\_TTI}/\text{Total\_TTI})} \quad \text{(Equation 13)}$$

where θ and σ can provide respective lower and upper bounds for γ.

Figure 11:
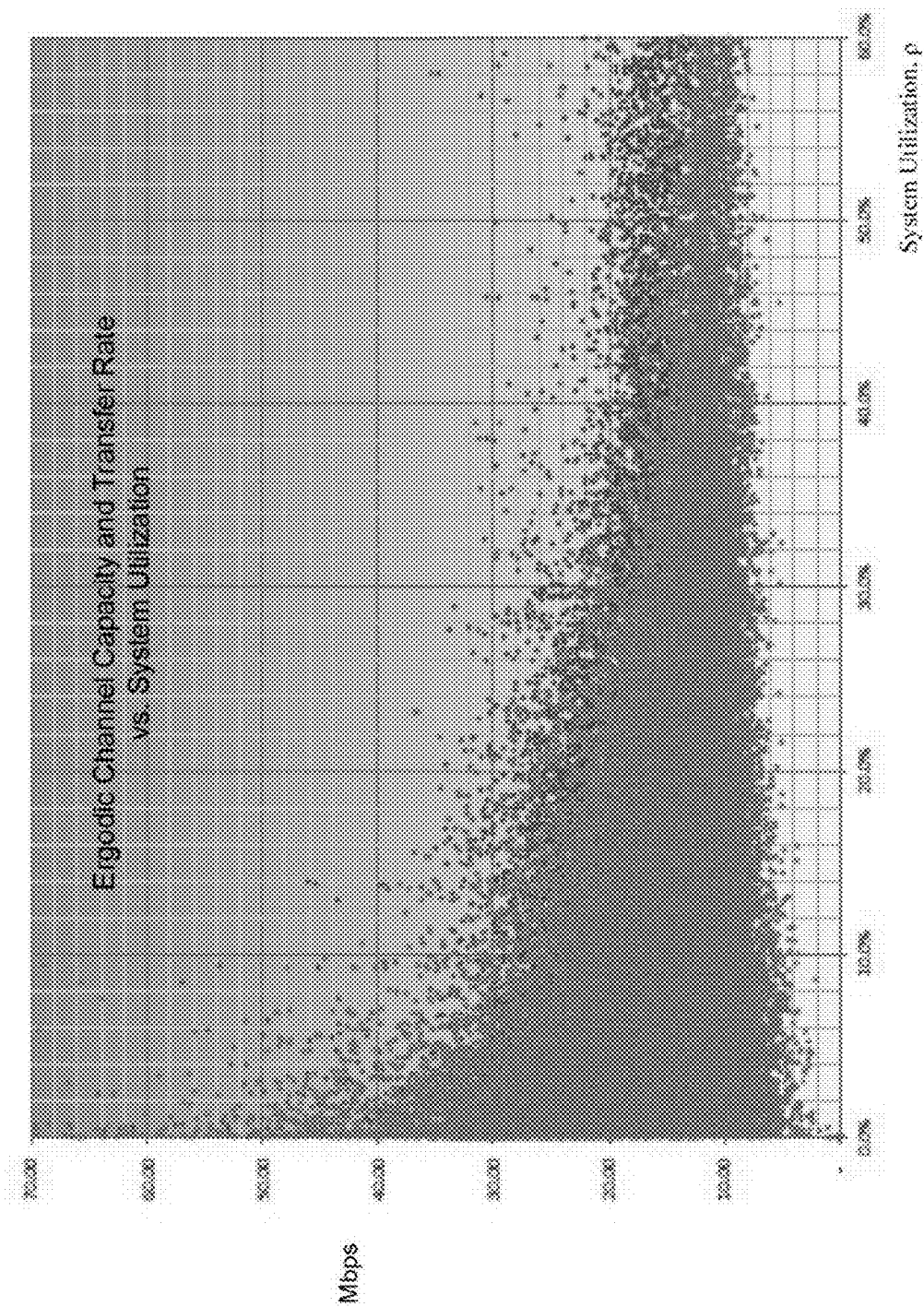
FIG. 11 illustrates an example graph of transfer rate and ergodic channel capacity in accordance with one or more embodiments described herein.

In some instances, for example when planning to rollout a new service (e.g., Voice over LTE (VoLTE) or videocall) with unknown traffic statistics, it may be beneficial to explicitly calculate the ergodic channel capacity. Combining Equations 7 and 9 above gives the expression provided in Equation 14 for the ergodic channel capacity. FIG. 11 illustrates an example graph.

Figure 4:
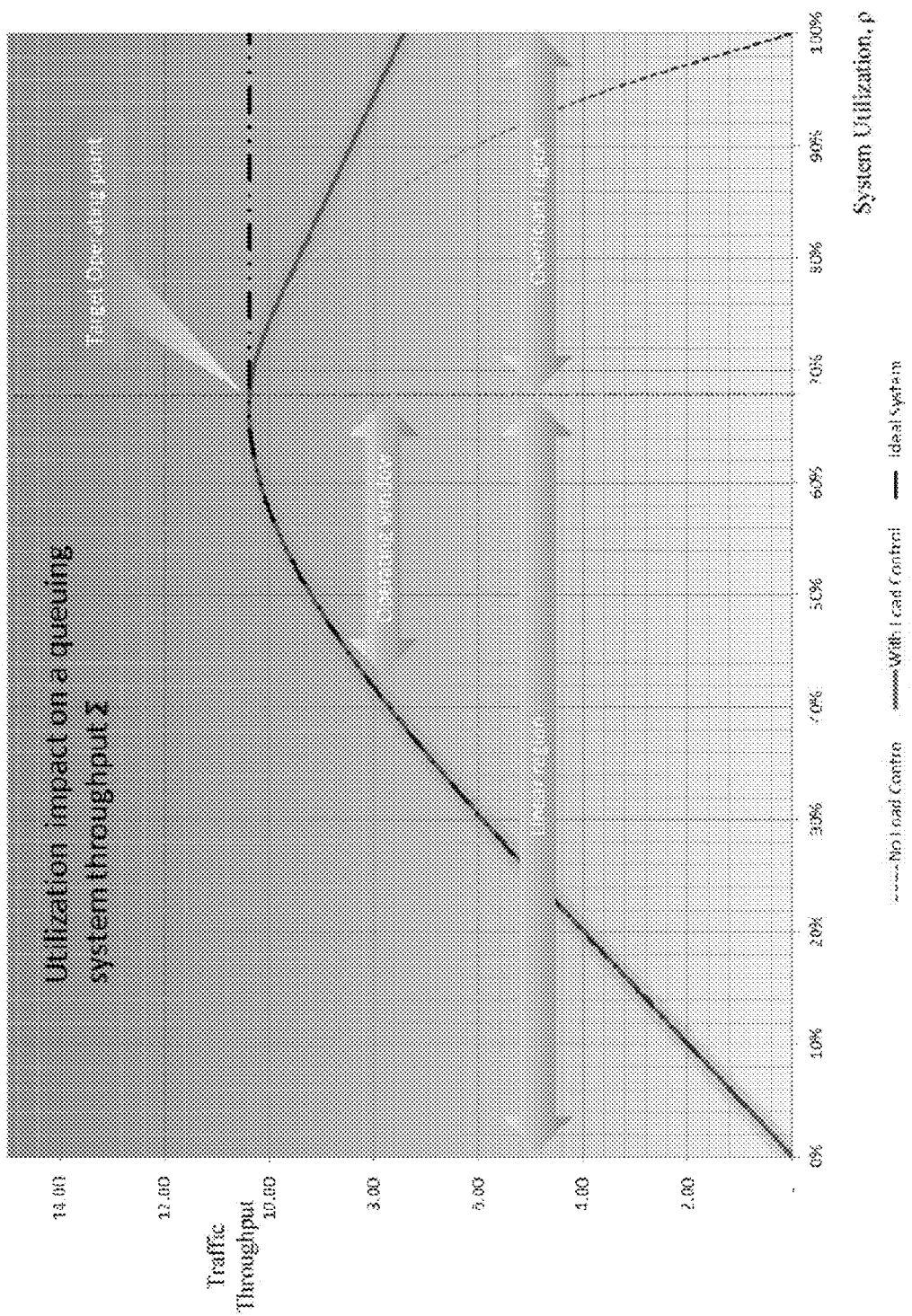
FIG. 4 illustrates an example graph depicting a queuing system for different traffic loading in accordance with one or more embodiments described herein.

Equation 14 provides a useful approximation for the ergodic channel capacity and can be used within the linear region as depicted in FIG. 4, that is for ρ<target operating point (TOP). As such, Equation 14 is valid for ρ<TOP.

$$ECC = \frac{(\theta + \sigma)}{(1-\rho) * \left(1 + \ln\left(\frac{1}{(1-\rho)}\right)\right)} \quad \text{(Equation 14)}$$

Recall that for practical eNode B applications, the TOP~60%. Radio frames counters (e.g., number of transport blocks/size) can be used to address utilization ranges from 0 to 100%.

FIG. 4 illustrates an example graph depicting a queuing system for different traffic loading in accordance with one or more embodiments described herein. As shown in FIG. 4, the TOP is the location at which system utilization ρ maximizes throughput Σ. Throughput can be measured in terms of Mbytes transferred per measurement period, average Mbps. It shall be noted that the throughput-utilization relationship is mostly linear if the system is operating below the target operating point.

In the queuing system for which performance is shown in FIG. 4, users compete for service and servers allocate resources based on a defined set of rules established by the scheduling policy. As shown, as the number of users and corresponding system utilization increases, the carried traffic-throughput increases almost linearly until a saturation point (shown as TOP/Engineering Capacity in FIG. 4) is reached. As the load and users in the system grows beyond the saturation point, the traffic throughput decreases eventually to a complete collapse if no load management techniques are implemented. The point that optimizes the cell sector capacity is defined as TOP, which is also the point that minimizes the number of RNs required to serve a particular traffic demand. The TOP criteria usually is complemented and/or constrained by the network operator desire to differentiate and/or provide better user experience than competitors. As shown, maximum throughput occurs at the TOP, and beyond the TOP, carried traffic decreases.

Figure 5:
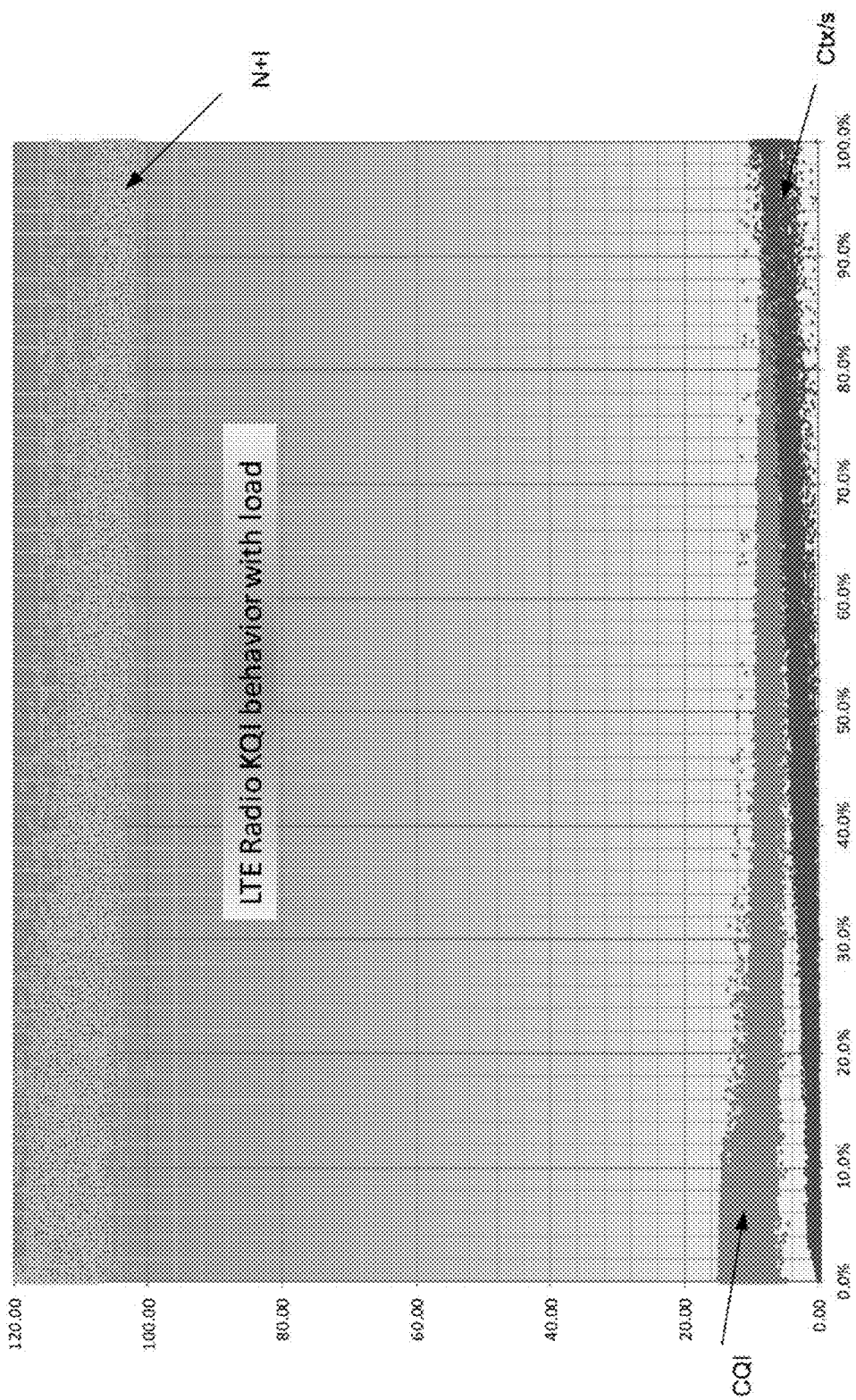
FIG. 5 illustrates an example graph detailing the behavior of measured noise plus interference power (N+I), channel quality index (CQI) and context setup per second (Ctx/sec) radio Key Quality Indexes (KQIs) with system load in accordance with one or more of the embodiments described herein.
Figure 6:
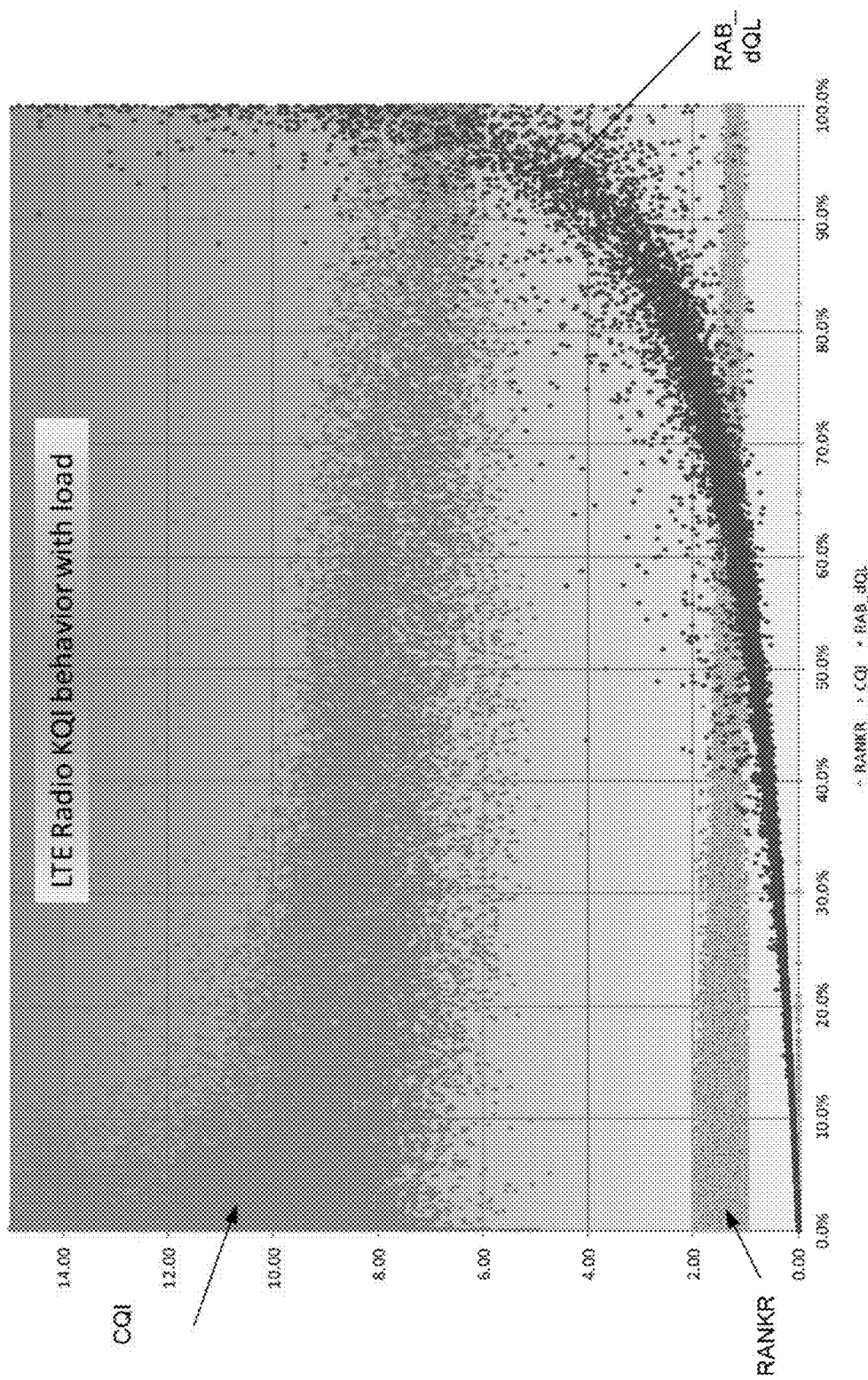
FIG. 6 illustrates an example graph detailing the behavior of RANKR, CQI and downlink radio access bearer queue length (RAB_dQL) with system load in accordance with one or more of the embodiments described herein.

FIG. 5 illustrates an example graph detailing the behavior of measured noise plus interference power N+I, Channel Quality Index CQI and context per second Ctx/sec radio KQIs with system load in accordance with one or more of the embodiments described herein, cell-sector level. As shown, all 3 radio KQIs degrade as the system load increases. FIG. 6 illustrates an example graph detailing the behavior of the MIMO Rank RANKR, CQI and downlink queue size RAB_dQL with system load in accordance with one or more of the embodiments described herein. As shown, the queue size increases with the load while the RANKR and CQI deteriorates. With reference to FIGS. 5 and 6, a small set of the radio KQI are presented; however, in other embodiments, the KQI can be tracked for each one of the tens of thousands of sectors that can be present in the network.

Figure 7:
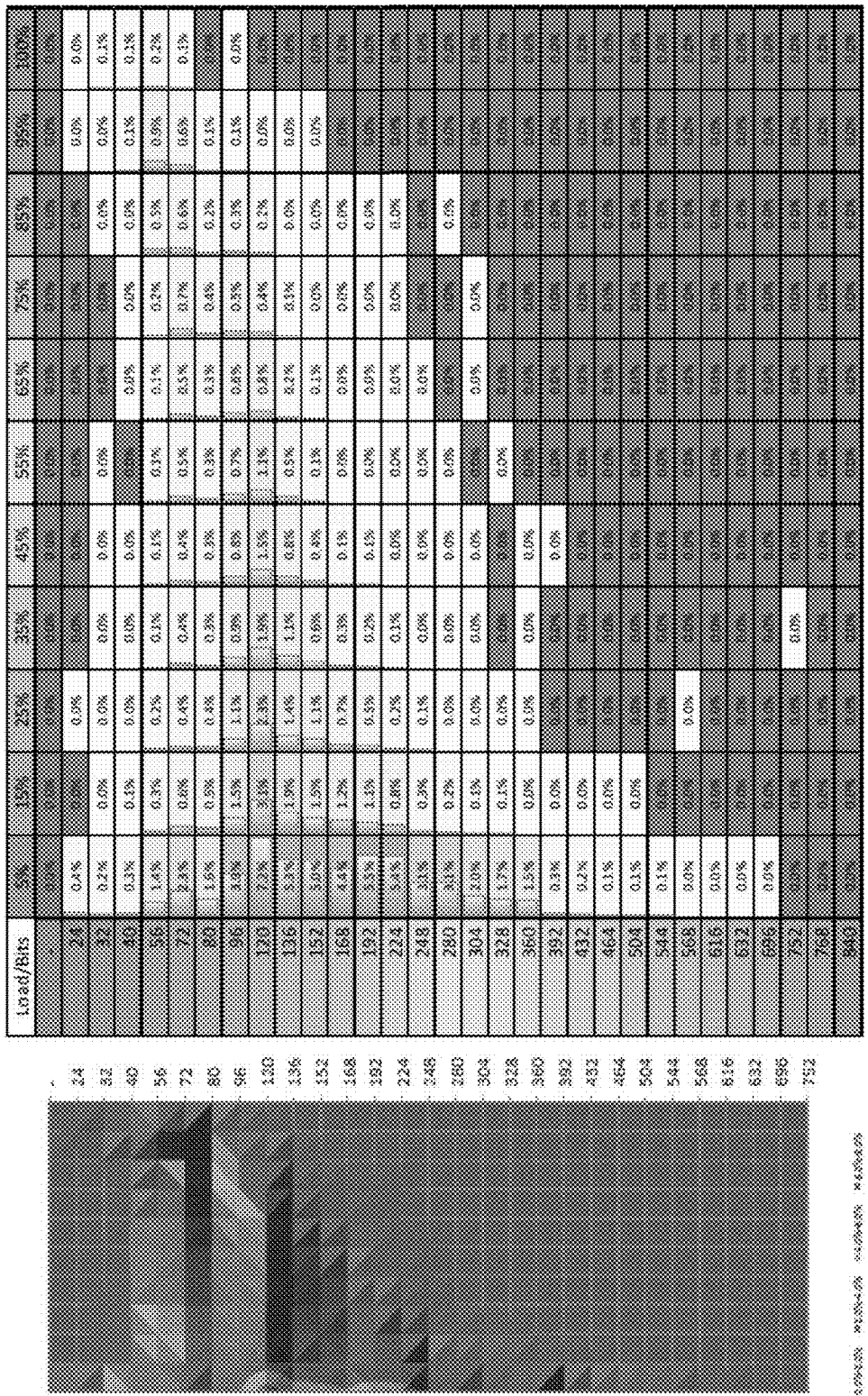
FIG. 7 illustrates an example dataset for an entire geographical region with thousands of sectors from which key findings for embodiments described herein.

FIG. 7 illustrates an example dataset for an entire geographical region with thousands of sectors from which various findings can be ascertained for embodiments described herein. In the embodiment shown, the UPC load is illustrated on the x axis, and the UIB/PRB variable is illustrated on the y axis and is proportional to the ergodic channel capacity for a given PRB size. As shown, the capacity for an RN device (e.g., LTE eNode B) can be characterized via two variables: the system utilization, ρ, and the ergodic channel capacity. The ergodic channel capacity can be modeled via the measured UIB/PRB (spectral efficiency) random variable while the RN utilization can be the ratio of TTI used. At a high utilization, the system throughput and rate transfer collapses, notwithstanding the vast array of flow and load control techniques available to a LTE system.

Figure 8:
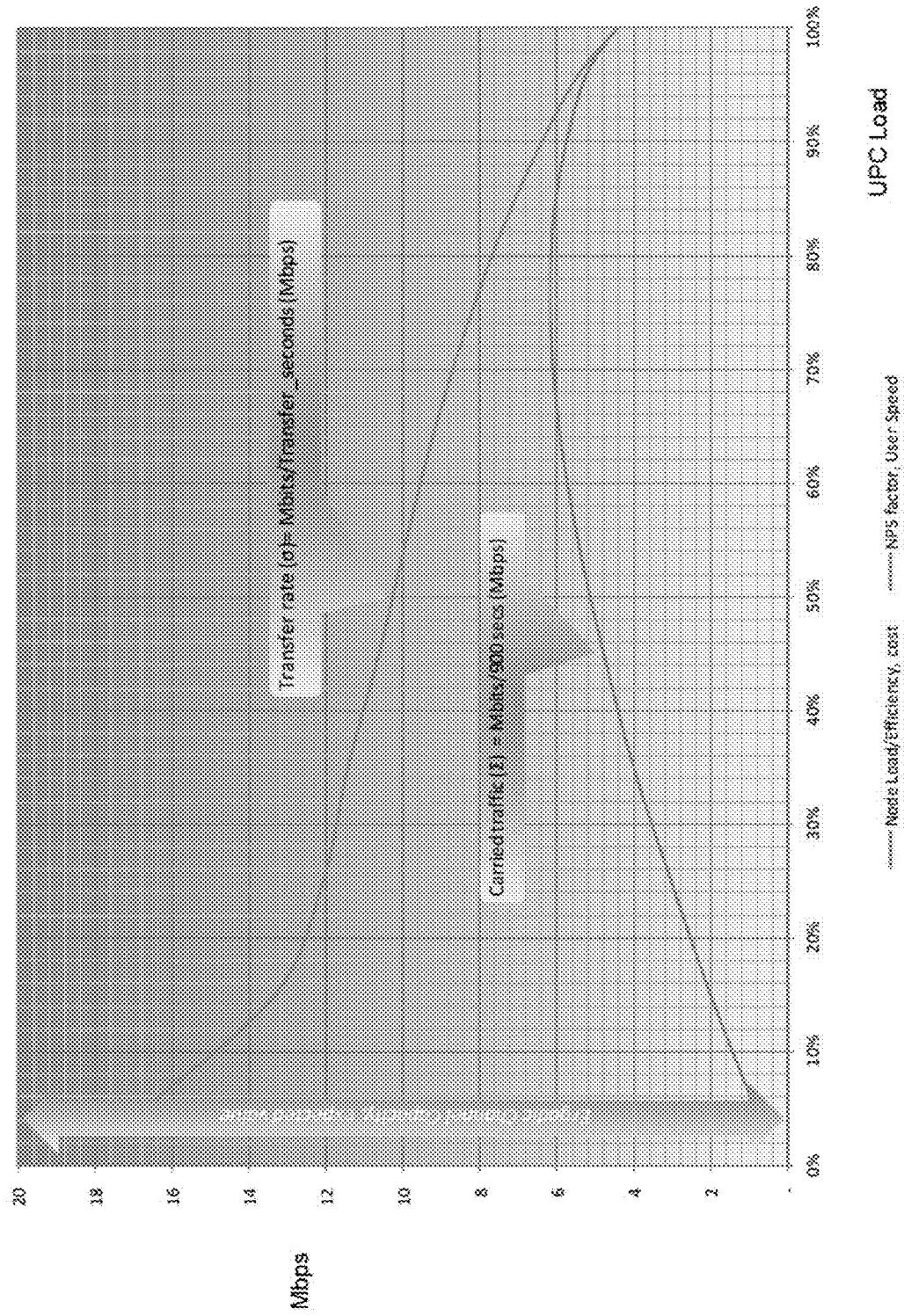
FIGS. 8, 9 and 10 illustrate example graphs depicting RN device (e.g., eNode B) queuing Strategic Performance Indexes (SPIs) based on the dataset shown in FIG. 7 in accordance with one or more of the embodiments described herein.
Figure 9:
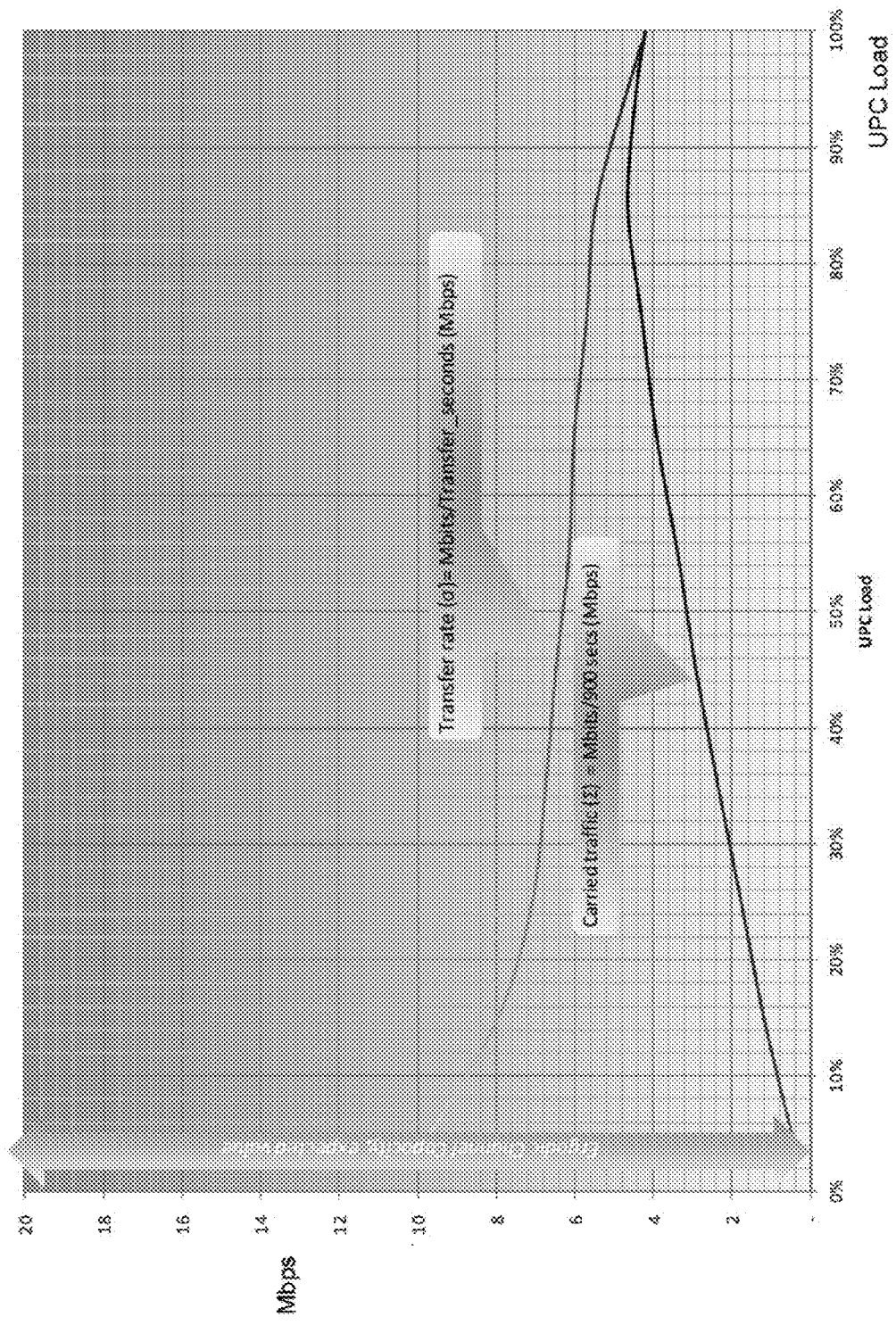
Figure 10:
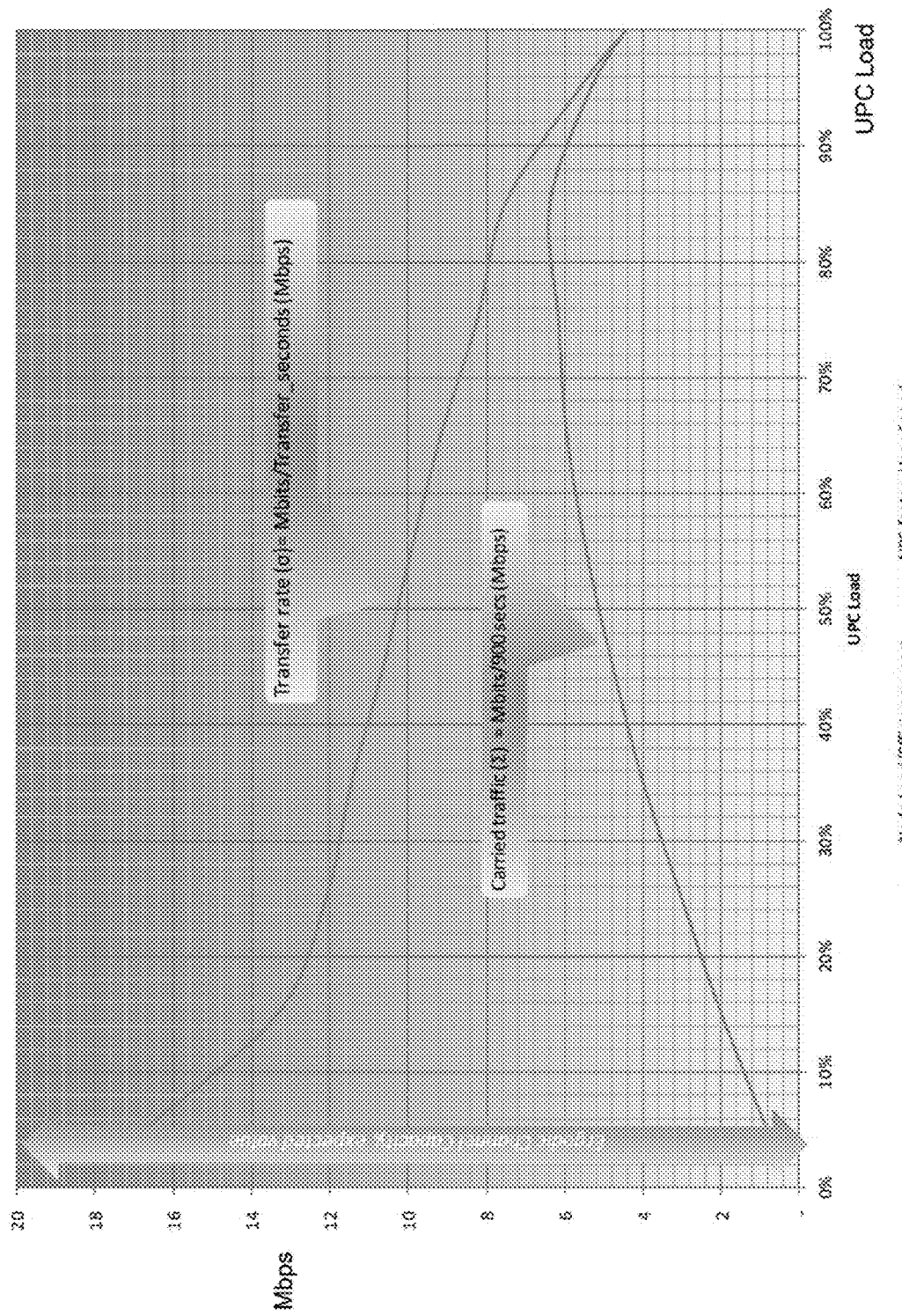

FIGS. 8, 9, 10 illustrate example graphs depicting the calculated RN device (e.g., eNode B) Strategic Performance Indexes (SPIs) Transfer Rate and Carried traffic based on the dataset exemplified in FIG. 7 in accordance with one or more of the embodiments described herein.

Turning first to FIG. 8, illustrated are the results of calculating the SPIs described in FIGS. 3 and 4 using LTE measurements as summarized by FIG. 7. For example, in FIG. 8, UPC utilization versus transfer rate for an LTE eNode B is shown. Information provided by FIG. 8 can represent the basis for several network optimization activities including, but not limited to, LTE parameter re-tuning, LTE cell splitting and/or new LTE radio layer trigger. Also these results can be used to perform real-time traffic management, for example, to re-direct traffic to a less used radio layer.

In some embodiments, FIG. 8 depicts the relationship between transfer rate and carried traffic for an eNode B sector with a carrier BW=10 megahertz (Mhz) 2×2 multiple input multiple output (MIMO) antenna configuration. Counters and methods described herein can be used to generate FIG. 8. The system load, $\rho$, is shown on the x axis and denoted as the UPC utilization. The transfer rate, $\sigma$, as well the carried traffic, $\Sigma$, are shown on the y axis. It shall be noted that FIG. 8 was developed using the BTC pdf counter.

FIGS. 4 and 8 each show that as the utilization, $\rho$, increases, the average transfer rate decreases. Further, as also shown, as the load, $\rho$, increases, the cell sector carried traffic (denoted as Engineering Capacity) increases until the TOP for the utilization (approximately 80%) is reached. If $\Sigma$ is the RN cell sector carried traffic (in Mbps), then Equation 15 details the transfer rate and cell sector carried traffic relationship as follows:

$$\Sigma = \rho \sigma \quad \text{(Equation 15)}$$

Comparing FIGS. 4 and 8, it is clear that the transfer rate of a wireless system degrades faster when compared to a WFQ system. FIGS. 5, 6 and 7 (all of them intermediate results that can be used by the KDD-assisted multi-RAT controller) show that this behavior can be triggered by the ergodic channel capacity dependency on the system load. As the load increases, the ratio of signal-to-noise plus interference decreases and MIMO rank decreases. The net impact is less UIB/PRB, which is a reduced ergodic channel capacity. Furthermore, as the ergodic channel capacity decreases, the number of frames used by the scheduler to transfer the same amount of information increases thereby using more TTI (and generating additional load to the UPC).

FIG. 8 also shows one of the fundamental limitations of an RN (or any queuing system), which is the difficulty of designing for concurrent excellent transfer rate and excellent cell sector carried traffic. By contrast, it is entirely possible to create a design that results in concurrent poor transfer rate and cell sector carried traffic.

Turning now to FIGS. 9 and 10, illustrated is the same analysis as that shown in FIG. 8 but at a finer network granularity based on a small cluster of RN devices (e.g., eNode Bs) at both 5 and 10 Mhz. FIGS. 9 and 10 show the relationship between transfer rate/carried traffic versus UPC utilization for the different configurations (e.g., 5 Mhz bandwidth) as well different terrain morphology. While the overall pattern remains unchanged, the TOP, transfer rate and/or carried load are specific to each configuration. Accordingly, one or more embodiments described herein are designed to determine automated solutions that perform calculations on a per site, per RN, per cell-sector basis. Nonetheless, the method scales well when aggregating nodes.

FIG. 11 illustrates an example graph of transfer rate and ergodic channel capacity intermediate calculation in accordance with one or more embodiments described herein. KDD-assisted multi-RAT controller 102 can employ the relationship denoted in Equation 15 to optimize network performance based on measurements collected and mapped to transfer rate and interface utilization.

Figure 12:
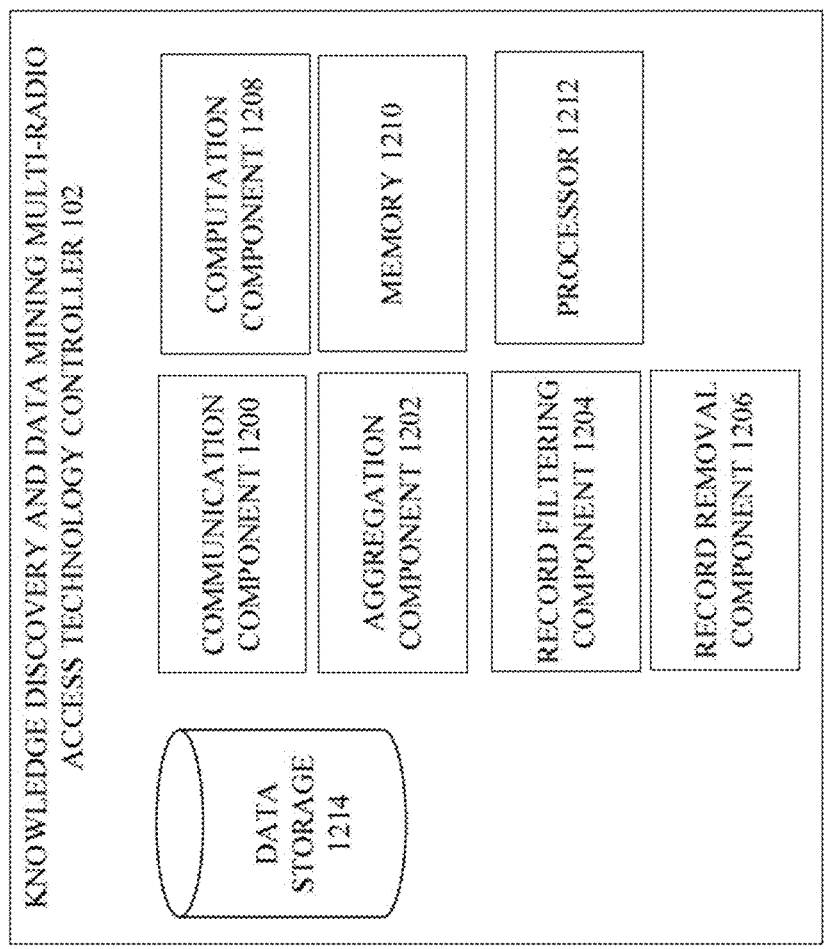
FIG. 12 illustrates an example block diagram of the KDD-assisted multi-RAT controller of FIG. 1, which can facilitate monitoring and capacity optimization of one or more RNs in accordance with one or more embodiments described herein.

FIG. 12 illustrates an example block diagram of the KDD-assisted multi-RAT controller of FIG. 1, which can facilitate monitoring and improvement of RN performance in accordance with one or more embodiments described herein. KDD-assisted multi-RAT controller 102 can include communication component 1200, aggregation component 1202, record filtering component 1204, record removal component 1206, computation component 1208, memory 1210, processor 1212 and/or data storage 1214. In one or more embodiments, communication component 1200, aggregation component 1202, record filtering component 1204, record removal component 1206, computation component 1208, memory 1210, processor 1212 and/or data storage 1214 can be electrically and/or communicatively coupled to one another to perform one or more functions of KDD-assisted multi-RAT controller 102. Repetitive description of like elements employed in respective embodiments of systems and/or apparatus described herein are omitted for sake of brevity.

Communication component 1200 can transmit and/or receive information from and/or at KDD-assisted multi-RAT controller 102. For example, in various embodiments, communication component 1200 can receive information indicative of one or more records, and/or entries, counters associated with records, detailing performance aspects of an RN. In various embodiments, the information received at KDD-assisted multi-RAT controller 102 can be organized into one or more tables with one or more rows of the table corresponding to a measurement at a defined point in time. Further, in some embodiments, within each record there can be hundreds of counters. For example, typically, the status of an eNode B of the RN is described by thousands of counter (e.g., RF counters, transport layer counters, main processor counters, TWAMP counters). A typical wireless network encompasses tens of thousands of RNs.

In some embodiments, communication component 1200 can receive and/or access per cell sector counters from an element management system (EMS)/network management system (NMS) repository associated with the RN and/or network 102. In some embodiments, the information can be organized as a relational table, with each row corresponding to a set of measurements for a unique cell sector of RN at a particular time interval.

Communication component 1200 can transmit information associated with assignment of one or more mobile devices to a first RN or a second RN based on information received at and/or analysis performed by KDD-assisted multi-RAT controller 102.

Aggregation component 1202 can aggregate one or more records and/or counters or entries associated with records and received from an RN. In various embodiments, aggregation component 1202 can categorize or separate the records based on the cell sector to which the records, counters and/or entries pertain and/or based on any number of other aspects of the information. By way of example, but not limitation, aggregation component 1202 can categorize, rank and/or prioritize information based on variables represented by the information. For example, aggregation component 1202 can aggregate variables that pertain to calculation of ergodic channel capacity and separately aggregate variables that pertain to interface load.

In some embodiments, aggregation component 1202 can aggregate a subset of records or other information obtained by communication component 1200. For example, while the information for each record length can be in excess of several hundred entries and/or counters, extensive analysis conducted off-line suggests that, in some embodiments, primarily the counters that impact the L1/L2 UPC of the eNode B for the RN cell sector should be included in the analysis performed by computation component 1208. Accordingly, less than 100 counters can be used to characterize the UPC state of the eNode B of the cell sector of the RN of interest. Aggregation component 1202 can aggregate the identified counters.

Record filtering component 1204 can filter malformed records received by communication component 1200. In some embodiments, record filtering component 1204 can perform a time series filtering method such that if a specific counter includes the wrong value, time series filtering methods can be performed to filter and recover the correct data for the counter.

Record removal component 1206 can identify and/or remove an erroneous record or information (e.g., counter, entry) associated with an erroneous record. For example, record removal component 1206 can identify corrupted data and remove such data. As another example, record removal component 1206 can identify records with values outside reasonable windows. For example, records with measured data volume in Mbytes but with 0% TTI utilization can be removed.

Computation component 1208 can perform data mining and/or exploratory data analysis to reduce the amount of information (e.g., records, counters) to be processed by KDD-assisted multi-RAT controller 102. For example, computation component 1208 can perform neural network analysis on the information received by communication component 1200 to search for a best fit neural network, and correspondingly reduce the number of counters to a few dozen (from the vast number of counters received by communication component 1208).

Computation component 1208 can also identify specific information to employ for computing ergodic channel capacity and interface load (in lieu of processing all information received for the computation). In some embodiments, computation component 1208 can employ eigenvalue analysis to map the selected information to the ergodic channel capacity and the interface load. The ergodic channel capacity and the interface load information can then be employed to determine whether the cell sector capacity and/or defined customer service level will be met, adjustments will be made to meet the desired cell sector capacity and/or defined customer service level or the like.

Computation component 1208 will be described in greater detail with reference to FIG. 13. Repetitive description of like elements employed in respective embodiments of systems and/or apparatus described herein are omitted for sake of brevity.

Figure 13:
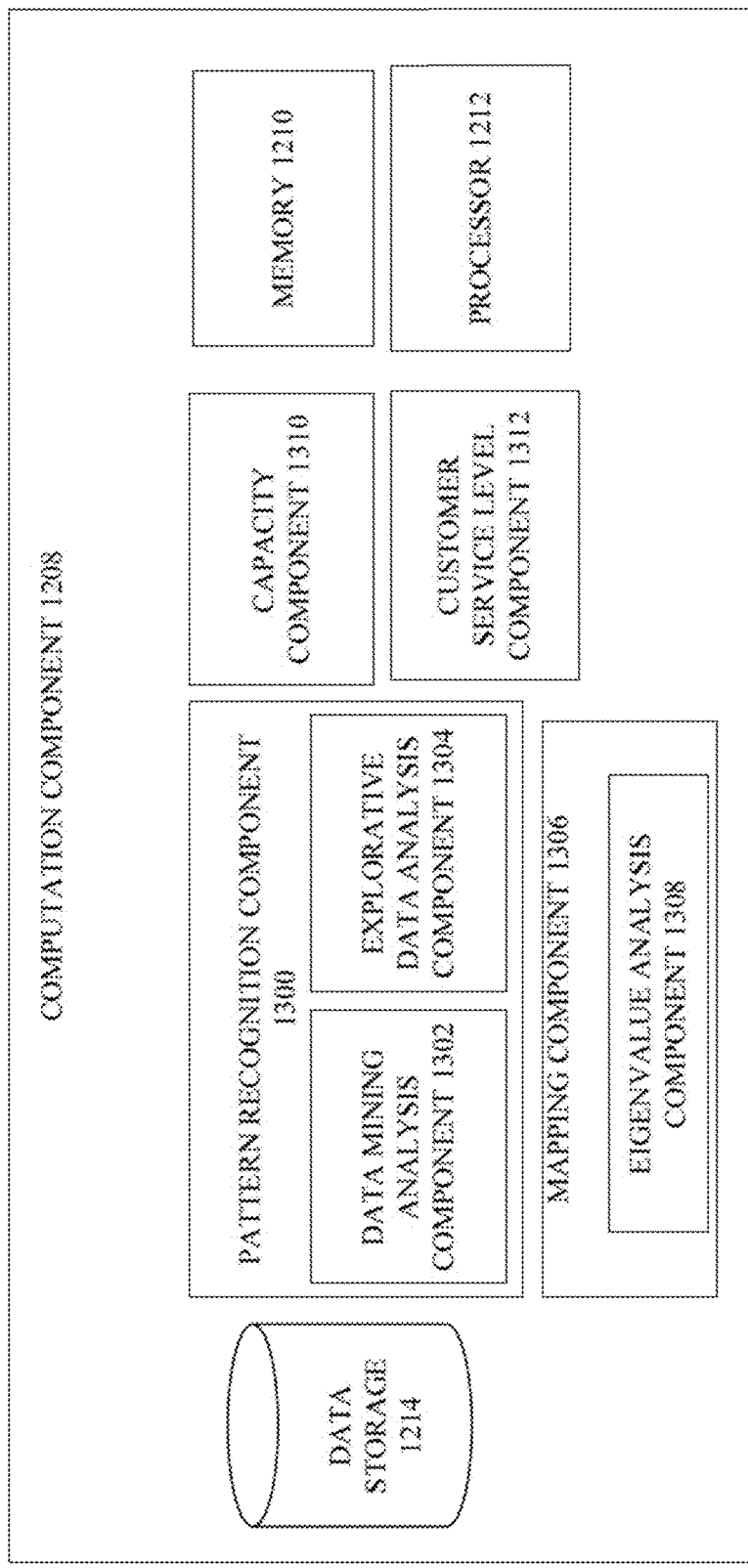
FIG. 13 illustrates an example block diagram of a computation component of the KDD-assisted multi-RAT controller of FIG. 12 in accordance with one or more embodiments described herein.

Turning to FIG. 13, computation component 1208 can include pattern recognition component 1300 (which can include data mining analysis component 1302 and exploratory data analysis component 1304), mapping component 1306 (which can include eigenvalue analysis component 1308), capacity component 1310, customer service level component 1312, memory 1210, processor 1212 and/or data storage 1214. In one or more embodiments, pattern recognition component 1300, mapping component, capacity component 1310, customer service level component 1312, memory 1210, processor 1212 and/or data storage 1214 can be electrically and/or communicatively coupled to one another to provide one or more functions of computation component 1208.

Pattern recognition component 1300 can include data mining analysis 1302 and exploratory data analysis component 1304. In various embodiments, data mining analysis 1302 and/or exploratory data analysis component 1304 can receive information associated with various counters and perform analysis (e.g., neural network analysis) to reduce the amount of information to be evaluated by KDD-assisted multi-RAT controller.

By way of example, but not limitation, data mining analysis component 1302 can train a set of neural networks using a plurality (e.g., hundreds of thousands) of measurements previously-received by communication component 1200. Knowledge discovery and data mining can be performed to identify information associated with independent variables (e.g., ergodic channel capacity and interface load) that best explain the behavior of a particular set of dependent variables of interest (e.g., cell sector capacity and defined customer service level/carried traffic and transfer rate). The dependent variables for the independent variables of interest were identified in the analysis described herein with reference to FIGS. 3 and 4 and Equations 1-15.

When a new technology is introduced into a large telecommunications network, engineering practices are created/updated to maintain/improve the service performance while minimizing capital and operational expenses. Lab testing, both conducted by the vendor/operator as well the operator field trials can provide a partial characterization of the expected behavior. For example, for wireless networks, since both lab as well field test (as radio frequency (RF) simulators) are based on a few active users the impact of system utilization (system load, active users in an eNode B) may be poorly understood. KDD techniques can be used by KDD-assisted multi-RAT controller of FIGS. 1 and 12 to understand and quantify the system behavior under evolving load for the operator-specific traffic patterns as well terrain morphology. Specifically, the KDD-assisted multi-RAT controller can employ neural networks to discover the set of counters or combination that shows the pattern presented in FIGS. 3 and 4 out of thousands of potential candidates. Examples of a few of the candidates are illustrated by FIGS. 5, and 6. Costly mistakes can result if the KDD process is not used. The expected outcome is the relationship illustrated by FIGS. 8, 9 and 10. An interesting fact about wireless telecommunications networks is that a few nodes (e.g., less than 20%) usually carry most of the traffic (e.g., more than 50%). Hence it is possible for the KDD-assisted multi-RAT controller of FIGS. 1 and 12 to use KDD techniques at a very early commercial deployment phase, by carefully selecting a heavy-loaded RN.

A neural network has inputs, which carry the values of variables of interest to engineer the network, and outputs, which are predictions for the transfer rate in this case. There can also be hidden layers that play an internal role in the neural network. The input, hidden and output neurons need to be connected together. The combination of input, hidden, output and interconnections determine the neural network type (e.g., multi-layer perceptron, radial basis, linear networks).

The first step is the choice of SPIs that represent the network cost and quality of service. As shown above, the transfer rate as defined by Equations 3, 9 and 10 provide good characterization for both the quality of service as well as allows the computation of the system carried traffic. The transfer rate can be a function of the system (bottleneck) utilization as well the channel capacity as any of transport interface subsystem 202, radio interface subsystem 203, L1/L2 subsystem 204 and/or IP/radio tunnel management subsystem 205.

In the next step, the KDD-assisted multi-RAT controller then queries the eNode B EMS/NMS and creates a table or other information repository. In some embodiments, the rows of a table represent the eNode B status at particular point in time. The size of the table for a large city exceeds 100K records per measurement day. The eNode B status, each row/record can contain hundreds of counters that track the status for each one of transport interface subsystem 202, radio interface subsystem 203, L1/L2 (radio) subsystem 204 and/or IP/radio tunnel management subsystem 205.

An initial exploratory data analysis confirms, for example, employing multiple regression using MatLab, that the bottleneck resides on the L1/L2 (radio) subsystem 204, specifically on the Data Plane/UPC, which is aligned with eNode B design goal. Furthermore, EDA analysis show that when the eNode B reaches saturation, e.g. transfer rate collapses, the transport interface subsystem 202, radio interface subsystem 203 and the IP/radio tunnel management subsystem 205 utilization remains quite low, mostly single digits, again per eNode B design goal. Henceforth, counters specific to the NPU/CPU can be pruned from the analysis. Note that this result can change if a new hardware design reallocates resources, for example, less processing power to the NPU and/or CPU components. Hence, for any new hardware design offline exploratory data analysis (or neural network analysis) can be repeated.

The pruned table, which can contain counters associated with L1/L2 (radio) subsystem 204 (e.g., radio tunnels counters), can be processed using neural network techniques. One of the counters retained in the pruned table is the transfer rate as defined by Equations 3, 9, 10. Furthermore, per FIG. 4, the behavior of the carried traffic to the system utilization can be approximated by a linear equation when L1/L2 (radio) subsystem 204 operates below the target operating point, linear region. Wireless operators design their networks to operate within the linear region and trigger specific actions if the RN drifts into the overload region.

Since the transfer rate is related to the carried traffic (as shown in Equation 15), to calculate the carried traffic, the transfer rate can be computed. Similarly, to compute the transfer rate, the carried traffic can be computed.

Extensive offline analysis using several millions of records that represent tens of thousands of eNode Bs shows that a simple linear neural network provides good performance in terms of the prediction error, an expected result. Henceforth, a linear neural network (e.g., feed forward with no hidden layers) can be implemented as part of the KDD-assisted multi-RAT controller described herein.

Figure 14:
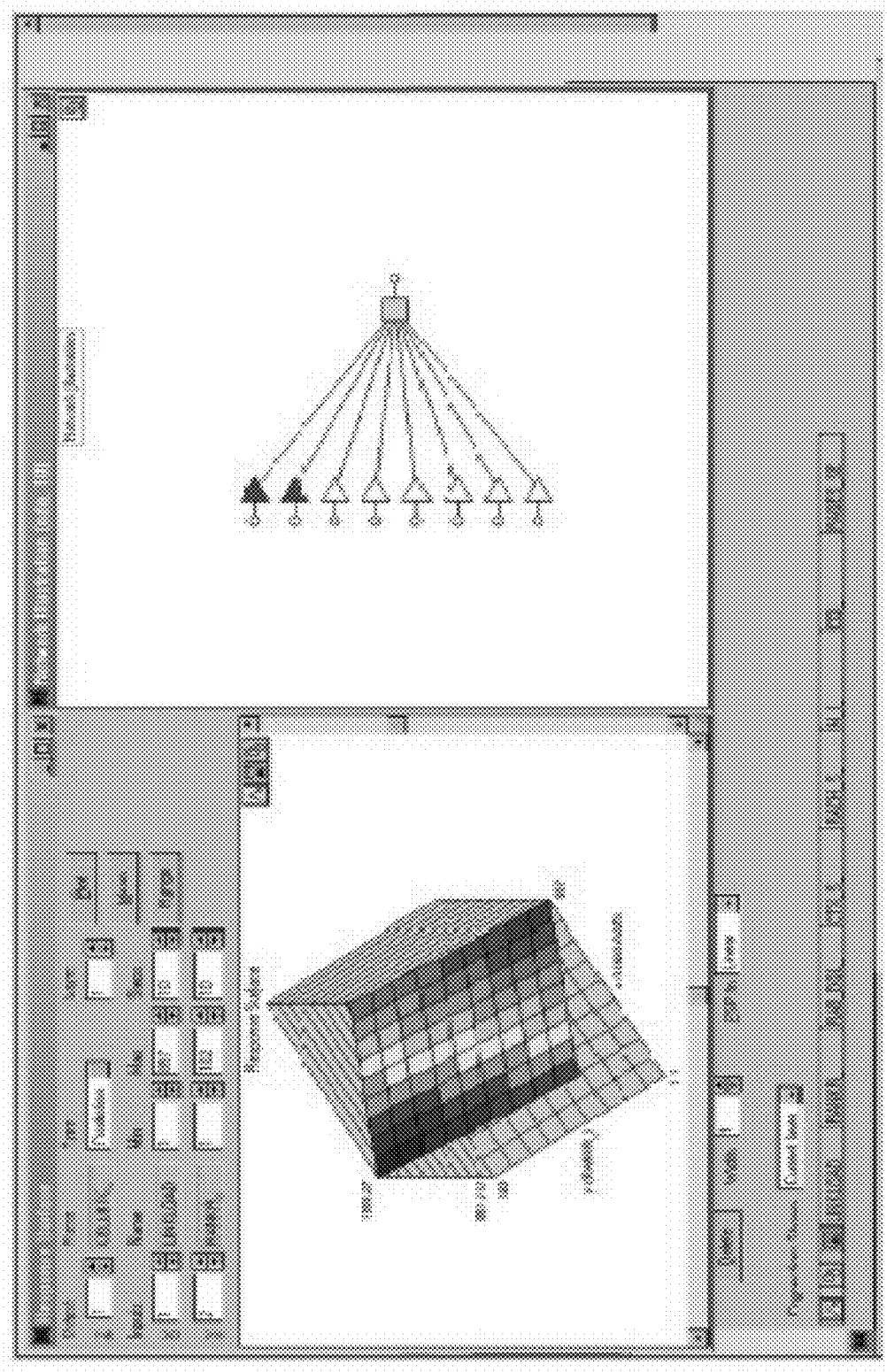
FIG. 14 illustrates an example screenshot of the result of neural network analysis providing a suggested relationship for the eNode B transfer rate variable and performed by the KDD-assisted multi-RAT controller of FIG. 12 in accordance with one or more embodiments described herein.

In some embodiments, the KDD-assisted multi-RAT controller can extract a linear neural network from the above pruned dataset. FIG. 14 illustrates an example screenshot of the result of neural network analysis providing a suggested relationship for the carried traffic/transfer rate as performed by the KDD-assisted multi-RAT controller of FIG. 12 in accordance with one or more embodiments described herein.

The neural network in FIG. 14 shows that the carried traffic/transfer rate can be dependent on the utilization of L1/L2 (radio) subsystem 204, context per second and/or pages per second (all queuing system measurements) but also dependent on the MIMO rank, CQI, signal-to-noise plus interference ratio in various embodiments, which can determine the RN Ergodic Channel Capacity.

After pattern recognition component 1300 identifies the information associated with the dependent variables of interest, in some embodiments, the information to be further analyzed is reduced to the identified information. As such, pattern recognition component 1300 can reduce the dimensionality of information to be processed by KDD-assisted multi-RAT controller 102. For example, the counter for radio resource control (RRC) active users, which can represent users executing a data/voice transfer, can have a very high linear correlation to RAB/second, context per second and, in some embodiments, most of the counters associated with the control plane (and/or IP/radio tunnel management subsystem 205). In a final step, the subset of variables suggested by the linear neural network can be condensed into two independent variables: the first variable explains the impact of queuing (user competing by the same resources) while the second variable addresses the radio Channel Capacity.

Turning back to FIG. 13, mapping component 1306 can include eigenvalue analysis component 1308. In various embodiments, mapping component 1306 can receive the information identified based on the analysis performed by pattern recognition component 1304 and map the information to the dependent variables of interest. In some embodiments, eigenvalue analysis component 1308 can employ eigenvalue analysis to map/rotate the information to the ergodic channel capacity and the interface load. Generally, eigenvalue rotation can be employed to attempt to combine the identified information (e.g., identified counters) to obtain a new set of counters that are a better descriptor as well have physical meaning associate with the dependent variables.

Figure 15:
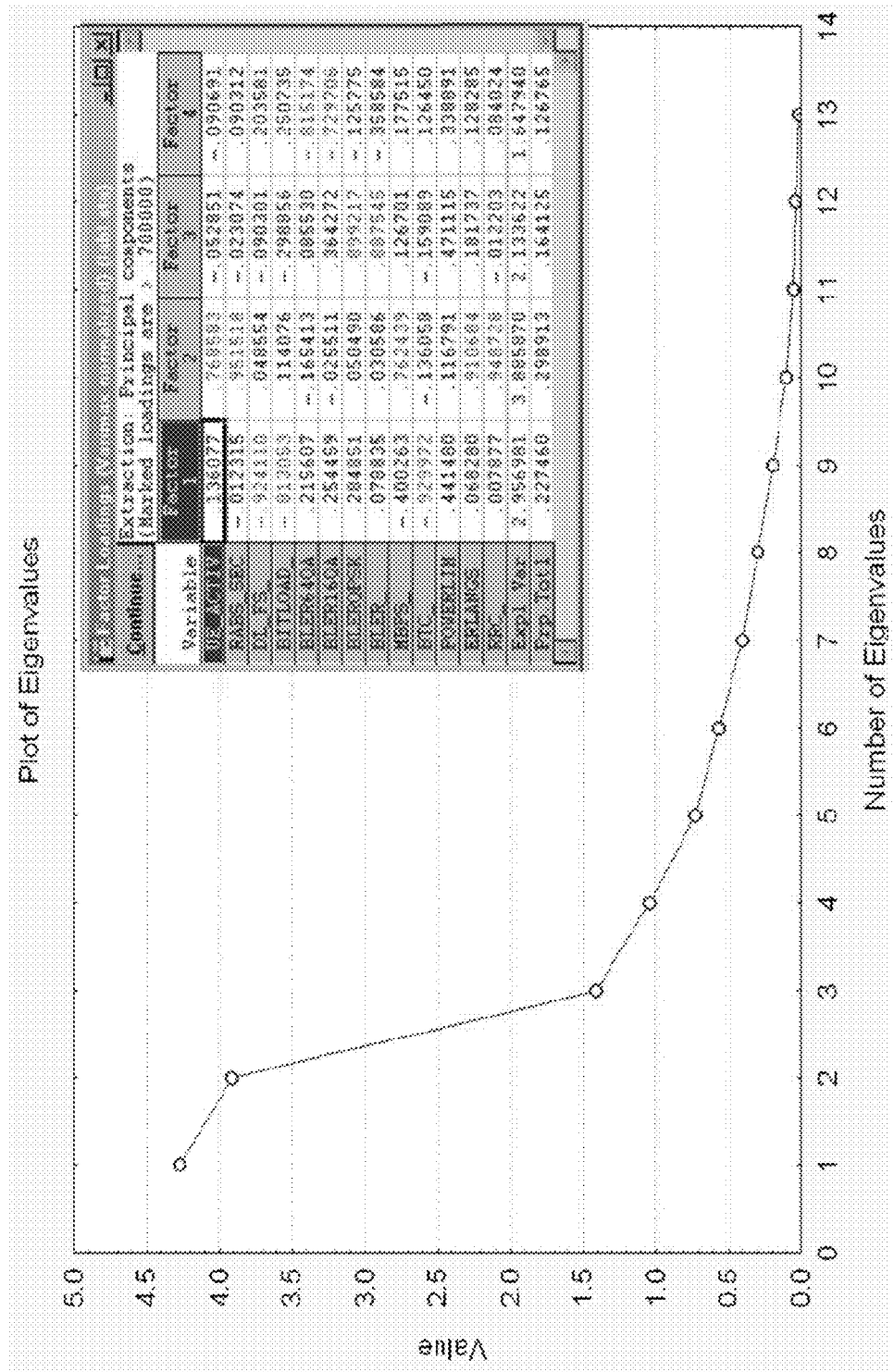
FIG. 15 illustrates an example graph and corresponding screenshot of the result of eigenvalue analysis performed by the KDD-assisted multi-RAT controller of FIG. 12 in accordance with one or more embodiments described herein.

FIG. 15 illustrates an example graph and corresponding screenshot of the result of eigenvalue analysis performed by the KDD-assisted multi-RAT controller of FIG. 12 in accordance with one or more embodiments described herein. The factor analysis can suggest (aligned with the neural networks analysis) that the carried traffic/transfer rate can be calculated by combining UPC counters into two variables, namely, the UPC utilization and the ergodic channel capacity.

Figure 16:
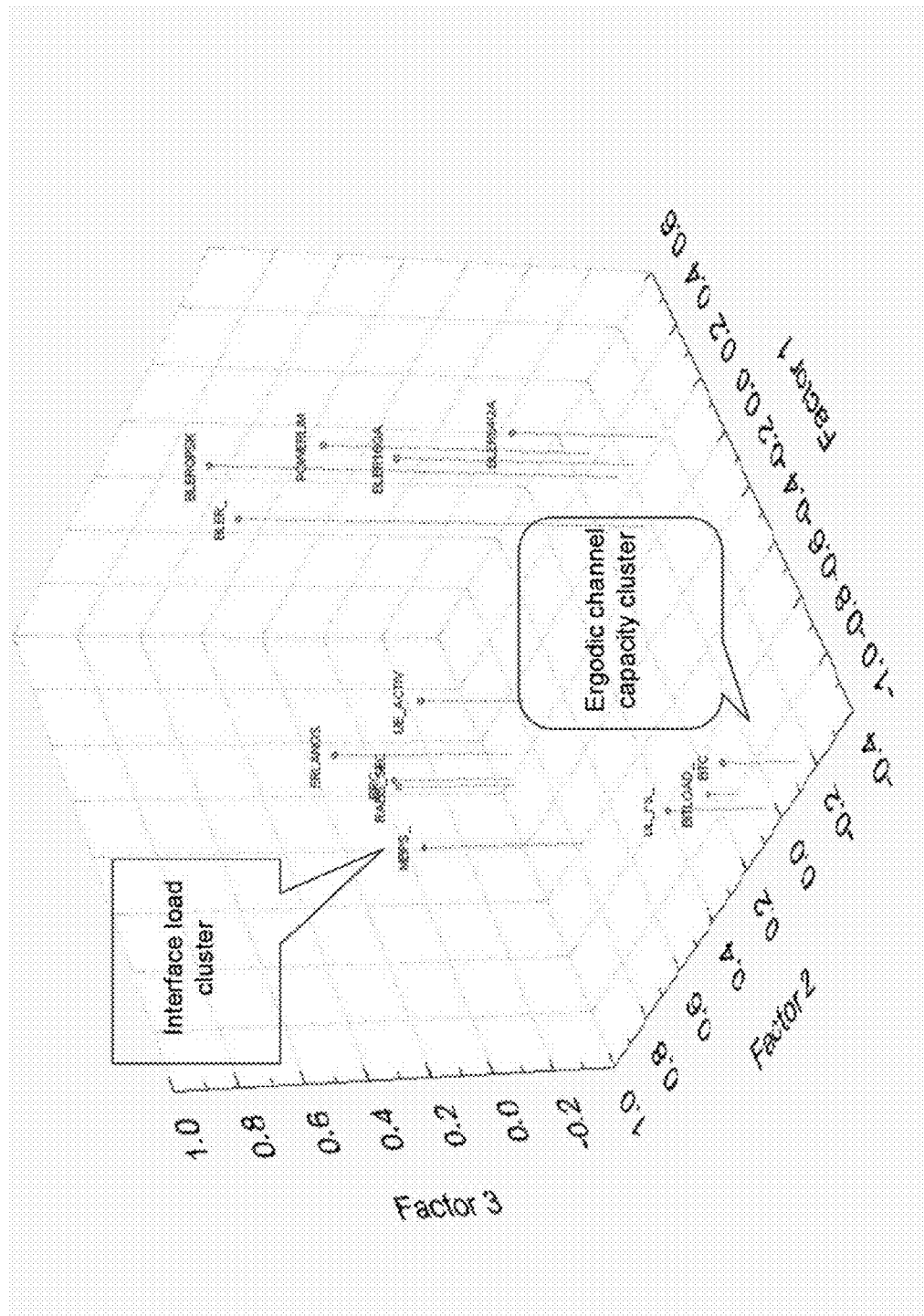
FIG. 16 illustrates an example graph of the result of factor analysis performed by KDD-assisted multi-RAT controller of FIG. 12 in accordance with one or more embodiments described herein.

FIG. 16 illustrates an example graph of the result of factor analysis performed by KDD-assisted multi-RAT controller of FIG. 12 in accordance with one or more embodiments described herein. FIG. 16 is an alternate view of FIG. 15, and explicitly shows the two subsets of variables to retain: a first subset characterizing the system utilization and the second subset the ergodic channel capacity.

Figure 17:
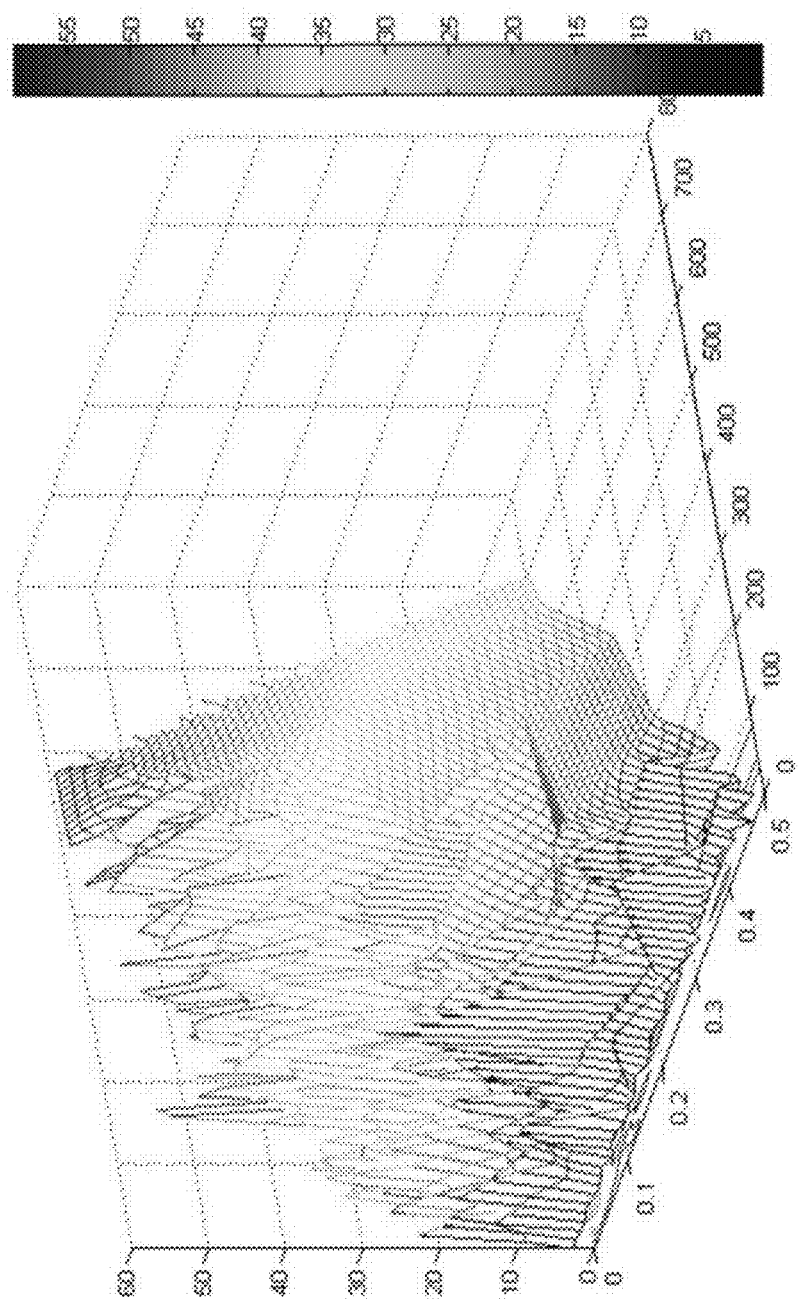
FIG. 17 illustrates an example graph of performance for a first type of software of an RN device in accordance with one or more embodiments described herein.

FIG. 17 illustrates an example graph of performance for an early first type of software release of an RN device (e.g., eNode B) in accordance with one or more embodiments described herein. The transfer rate is shown on the z axis, UIB/PRB (0 to 800 UIB/PRB) is shown on the x axis and, on the y axis, the HARQ error rate (the recommended utilization factor) is shown from 0 to 50%. For this early software, the transfer rate is dependent on the HARQ NACK rate as well as the UIB/PRB. However, notwithstanding the specific aspects of this software, in this embodiment, KDD-assisted multi-RAT controller can be employed to detect transfer rate (z axis) dependence on the system load as well ergodic channel capacity.

When the eNode B includes a second type of software, this dependency on the HARQ NACK is diminished. Accordingly, the variables that define the system performance varies by software (and/or hardware) of the eNode B. For example, UPC utilization is a better variable to explain the overall system performance in the second type of software. Accordingly, the KDD-assisted multi-RAT controller can execute in an ongoing basis to track changes induced by new hardware, standards and software.

Turning back to FIG. 12, computation component 1208 can search for and discover information associated with the ergodic channel capacity, ECC, and interface utilization, $\rho$, for a particular RN platform. The actual counters to use to compute, $\rho$ and C, are dependent upon the technology (e.g., LTE, UMTS, WiMAX) employed and, as such, can be re-determined when/if technology and/or RN implementation (e.g., hardware and/or software for the eNode B) changes. Henceforth the method of operation of computation component 1208 can be performed iteratively over one or more (or all) technologies and hardware and/or software implementations of eNode Bs present in the network.

In some embodiments, the recommended counter to characterize the load for L1/L2 subsystem 204 (or a component of L1/L2 (radio) subsystem 204) can be the percentage of milliseconds that the L1/L2 (radio) subsystem 204 (or component of L1/L2 (radio) subsystem 204) is forwarding traffic. This counter can be the TTI utilization counter. In embodiments in which the RN device (e.g., eNode B) operates as a queuing batch server, use of this counter can be especially advantageous.

For the ergodic channel capacity, in some embodiments, the metric to use is UIB/PRB*PRBs. In some embodiments, UIB/PRB may not be a single counter. In these cases, UIB/PRB can be calculated employing CQI, MIMO_Rank, Data_volume_transfer, and/or TBS counters.

KDD-assisted multi-RAT controller 102 can then acquire the per cell sector interface load and compare against load policies to calculate an optimal load allocation between layers, at the cell sector level. In some embodiments, KDD-assisted multi-RAT controller 102 can forward the calculation results to the eNode B as well as one or more mobile devices associated with the eNode B via access network discovery and selection function (ANDSF) radio frequency interface (RFI). KDD-assisted multi-RAT controller 102 can also compute the cell sector capacity and/or a score associated with customer service level (e.g., a DL T-put score) for the RN (or cell sector of the RN).

Memory 1210 can be a computer-readable storage medium storing computer-executable instructions and/or information for performing the functions described herein with reference to KDD-assisted multi-RAT controller 102 (or any components of KDD-assisted multi-RAT controller 102). For example, memory 1210 can store computer-executable instructions that can be executed by processor 1212 to perform communication, analysis, mapping or other types of functions executed by KDD-assisted multi-RAT controller 102 (or any components of KDD-assisted multi-RAT controller 102). Processor 1212 can perform one or more of the functions described herein with reference to KDD-assisted multi-RAT controller 102 (or any components of KDD-assisted multi-RAT controller 102). For example, processor 1212 can format, process and/or generate records information, perform pattern recognition on records information to reduce the amount of records information, perform data mining and/or exploratory data analysis methods as part of the pattern recognition, perform mapping of information to ergodic channel capacity and the interface load based on performing eigenvalue analysis, performing eigenvalue analysis or the like.

Figure 18:
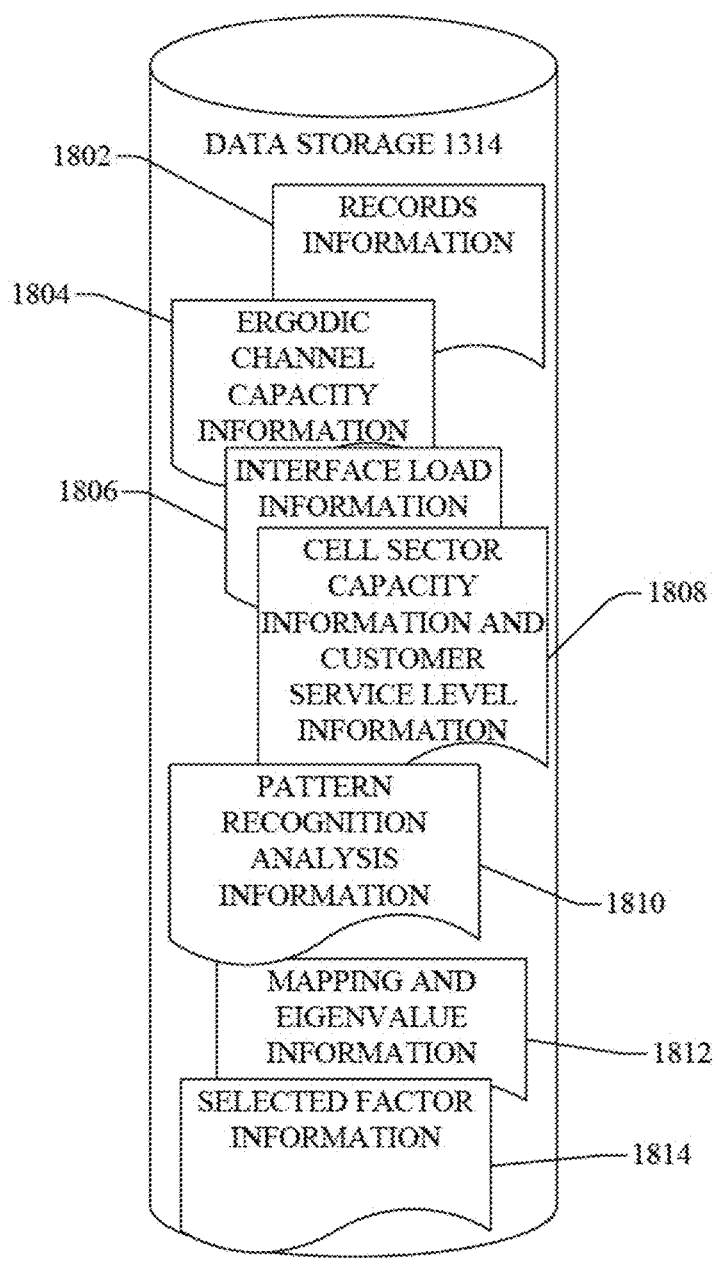
FIG. 18 illustrates an example block diagram of data storage of the KDD-assisted multi-RAT controller of FIG. 12 in accordance with one or more embodiments described herein.

Data storage 1214 can be described in greater detail with reference to FIG. 18. FIG. 18 illustrates an example block diagram of data storage of the KDD-assisted multi-RAT controller of FIG. 12 in accordance with one or more embodiments described herein. Repetitive description of like elements employed in respective embodiments of systems and/or apparatus described herein are omitted for sake of brevity.

As shown, data storage 1214 can be configured to store information accessed by, received by and/or processed by KDD-assisted multi-RAT controller 102 or any component of KDD-assisted multi-RAT controller 102 (e.g., computation component 1208). For example, data storage 1214 can store records information 1802 such as counters and/or measurements for an RN (or for one or more different sectors of an RN). Data storage 1214 can also include ergodic channel capacity information 1804 such as information indicative of a current or past ergodic channel capacity computed for an RN (or a sector of an RN) retrieved from records information 1802.

Data storage 1214 can include interface load information 1806 such as information such as information indicative of a past or current interface load retrieved from records information 1802. Data storage 1214 can include cell sector capacity information and customer service level information 1808 such as the required capacity and customer service levels (e.g., quality of service information) desired for an RN.

Data storage 1214 can include pattern recognition analysis information 1810. Pattern recognition analysis information 1810 information retrieved from current or past pattern recognition performed for RN, information collected for the RN on which pattern recognition will be performed, instructions and/or weighting information for performing data mining (e.g., neural network, machine learning) or exploratory data analysis methods on the collected information for RN.

Data storage 1214 can also include mapping and eigenvalue information 1812 such as information for performing an eigenvalue analysis on counters or information associated with counters retrieved from an RN. For example, mapping and eigenvalue information 1812 can include values of current or past eigenvalues computed. In some embodiments, mapping and eigenvalue information 1812 can include information related to matrices employed in performing various computations in the eigenvalue analysis.

Data storage 1214 can also include selected factor information 1814 such as information identifying selected factors for achieving defined RN cell sector capacity and/or defined customer service level. In some embodiments, selected factor information 1814 can include information identifying ergodic channel capacity and interface load for an RN device. In other embodiments, other factors can be identified for achieving desired performance of an RN device.

FIGS. 19-23 illustrate example flowcharts of methods that facilitate monitoring and improvement of RN performance utilizing a KDD-assisted multi-RAT controller in accordance with one or more embodiments described herein.

Figure 19:
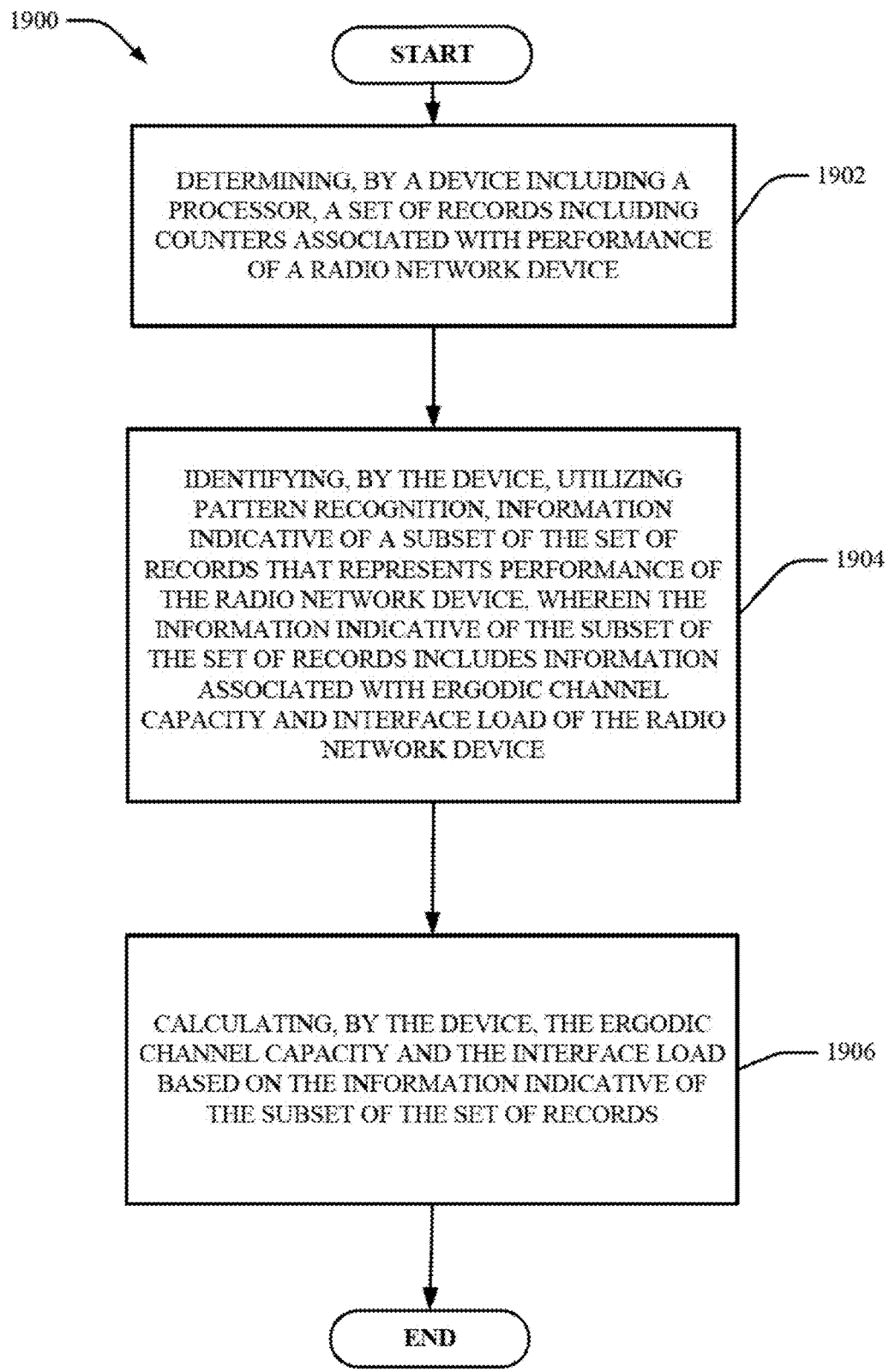
FIGS. 19-23 illustrate example flowcharts of methods that facilitate monitoring and improvement of RN performance utilizing a KDD-assisted multi-RAT controller in accordance with one or more embodiments described herein.

Turning first to FIG. 19, at 1902, method 1900 can determining, by a device including a processor, a set of records including counters associated with performance of an RN device. For example, with reference to FIGS. 19 and 1, the device can be or include KDD-assisted multi-RAT controller 102, and/or the RN device can be or be included in eNode B $110_1$ of RN $105_1$.

At 1904, method 1900 can include identifying, by the device, utilizing pattern recognition, information indicative of a subset of the set of records that represents a performance of the RN device. In various embodiments, the information indicative of the subset of the set of records includes information associated with ergodic channel capacity and interface load of the RN device.

With regard to pattern recognition, in various embodiments, data mining can be employed. In some embodiments, neural network analysis can be a type of data mining analysis performed. From several hundred counters associated with each RN device, independent counters, a neural network analysis can be performed to identify counters that better explain the behavior of a particular set of independent counters (e.g., RN cell sector capacity and defined customer service level).

In some embodiments, pattern recognition includes performing a method in which information indicative of a pattern associated with a defined relationship between ergodic channel capacity of the RN device, interface load of the RN device and/or defined KQIs is identified.

At 1906, method 1900 can include calculating, by the device, the ergodic channel capacity and the interface load based on the information indicative of the subset of the set of records. The ergodic channel capacity and the interface load can be associated with defined KQIs indicative of the performance of the RN device. In some embodiments, the KQIs include the cell sector capacity for the RN device and a defined customer service level for mobile devices associated with the RN device.

Figure 20:
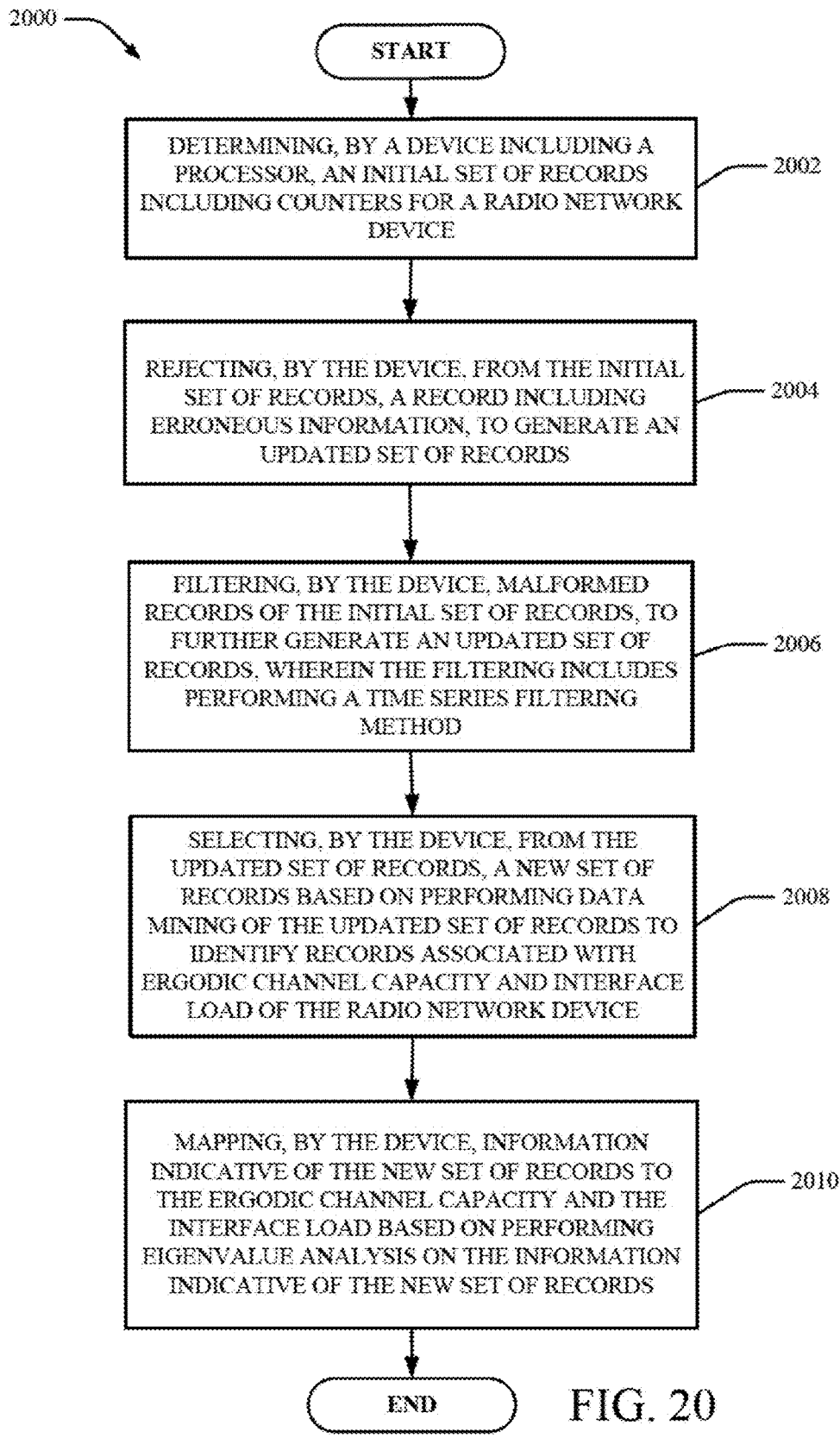

Turning now to FIG. 20, at 2002, method 2000 can include determining, by a device including a processor, an initial set of records including counters for an RN device. For example, with reference to FIGS. 20 and 1, the device can be or include KDD-assisted multi-RAT controller 102, and the RN device can be or include eNode B $110_1$ of RN $105_1$.

The prevalent problem with counters in some embodiments is that, due to high utilization, the eNode B does not complete the subroutine to compute the counters. As a result, a record may include an erroneous value. For example, sometimes data included in a record is corrupted (e.g., memory corruption) and the data must be discarded. Accordingly, at 2004, method 2000 can include rejecting, by the device, from the initial set of records, a record including erroneous information, to generate an updated set of records.

As another example, a first record may include a value of "0" for some of the counters and the subsequent record may have a value that equals the sum of the missed reporting periods. Accordingly, at 2006, method 2000 can include filtering, by the device, malformed records of the initial set of records, to further generate the updated set of records, wherein the filtering includes performing a time series filtering method. For the specific counter that includes the wrong value, a time series can be built and time series methods can be employed to filter and recover the correct data.

At 2008, method 2000 can include selecting, by the device, from the updated set of records, a new set of records based on performing data mining of the updated set of records to identify records associated with ergodic channel capacity and interface load of the RN device.

At 2010, method 2000 can include mapping, by the device, information indicative of the new set of records to the ergodic channel capacity and the interface load based on performing eigenvalue analysis on the information indicative of the new set of records. For example, the counters definition may not be a good match for the counters that better describe the model behavior (e.g., the counters that represent the ergodic channel capacity and the interface load, which describe the joint requirements of RN cell sector capacity and customer service level for the RN device). Accordingly, in some embodiments, an eigenvalue rotation can be performed to combine counters to obtain a new set of counters that are a better descriptor as well as have physical meaning.

Figure 21:
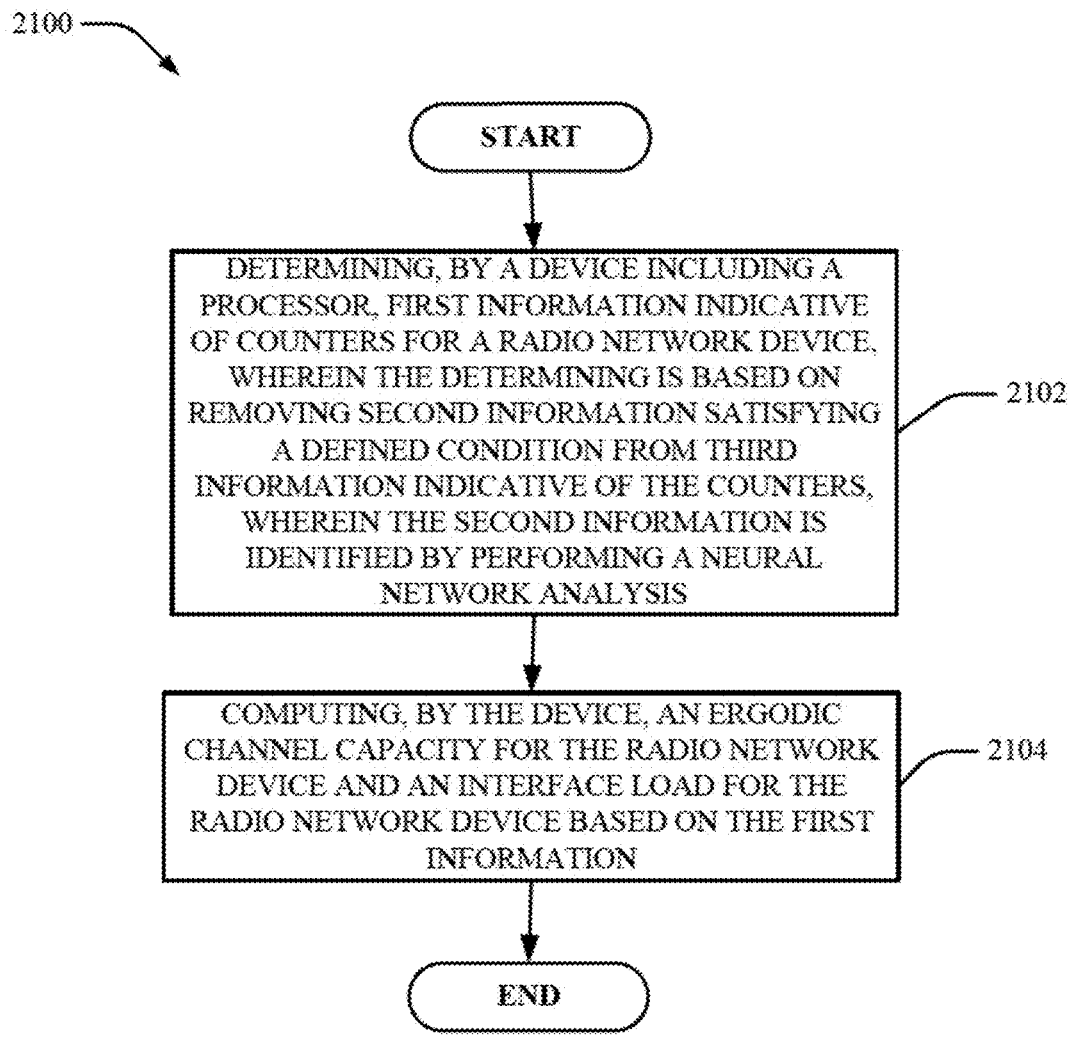

Turning now to FIG. 21, at 2102, method 2100 can include determining, by a device including a processor, first information indicative of counters for an RN device, wherein the determining is based on removing second information satisfying a defined condition from third information indicative of the counters, wherein the second information is identified by performing a neural network analysis. For example, with reference to FIGS. 21 and 1, the device can be or include KDD-assisted multi-RAT controller 102, and the RN device can be or include eNode B $110_1$ of RN $105_1$.

At 2104, method 2100 can include computing, by the device, an ergodic channel capacity for the RN device and an interface load for the RN device based on the first information. In some embodiments, the defined condition is associated with a defined cell sector capacity of the RN device and a defined customer service level for the RN device.

Figure 22:
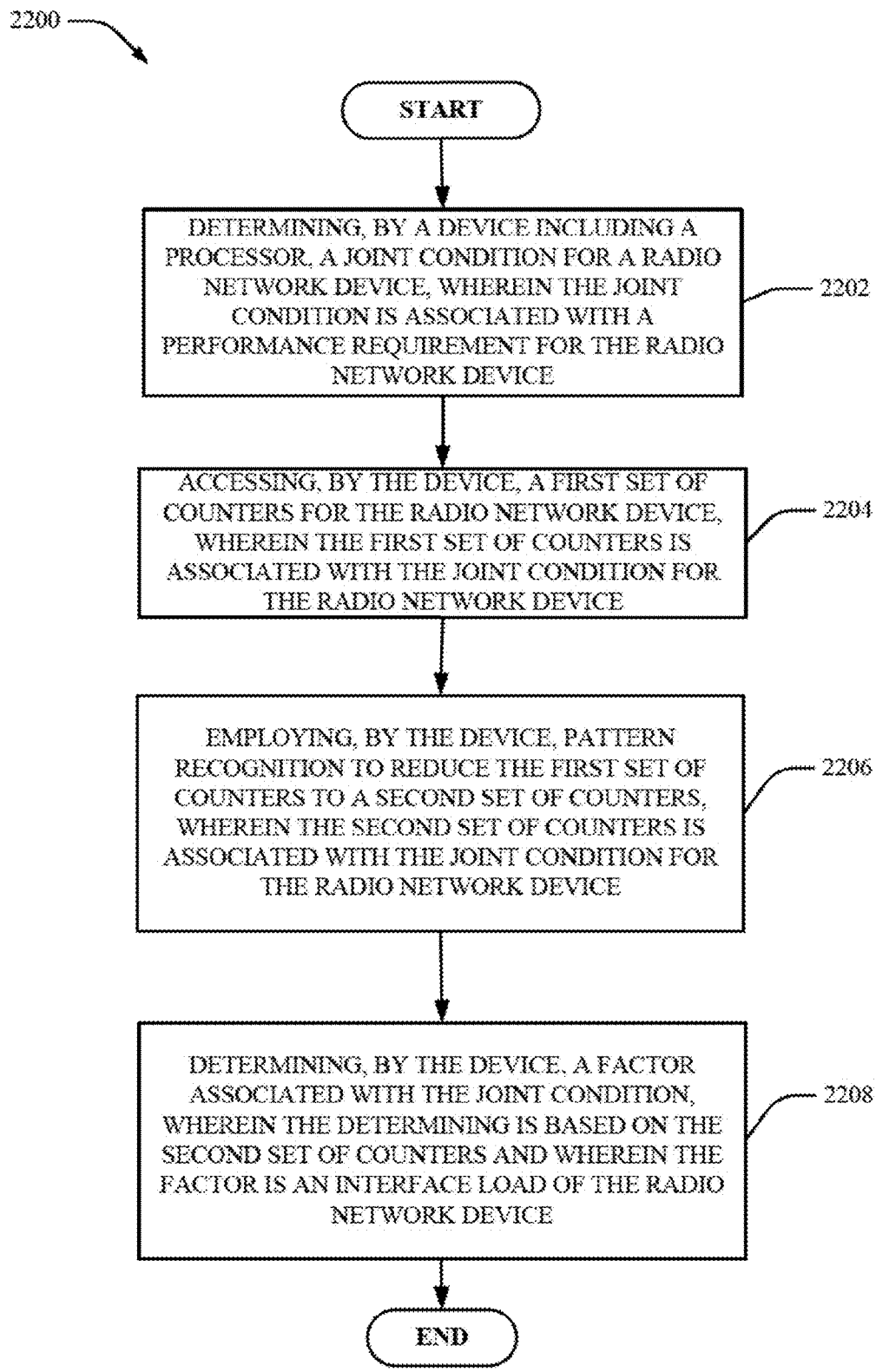

Turning now to FIG. 22, at 2202, method 2200 can include determining, by a device including a processor, a joint condition for an RN device, wherein the joint condition is associated with a performance requirement for the RN device. For example, with reference to FIGS. 22 and 1, the device can be or include KDD-assisted multi-RAT controller 102, and the RN device can be or include eNode B $110_1$ of RN $105_1$.

At 2204, method 2200 can include accessing, by the device, a first set of counters for the RN device, wherein the first set of counters is associated with the joint condition for the RN device. At 2206, method 2200 can include employing, by the device, pattern recognition to reduce the first set of counters to a second set of counters, wherein the second set of counters is associated with the joint condition for the RN device. At 2208, method 2200 can include determining, by the device, a factor associated with the joint condition, wherein the determining is based on the second set of counters and wherein the factor is an interface load of the RN device. The joint condition can be cell sector capacity.

In other embodiments, the joint condition can be a defined customer service level and the factor can be a ergodic channel capacity.

Figure 23:
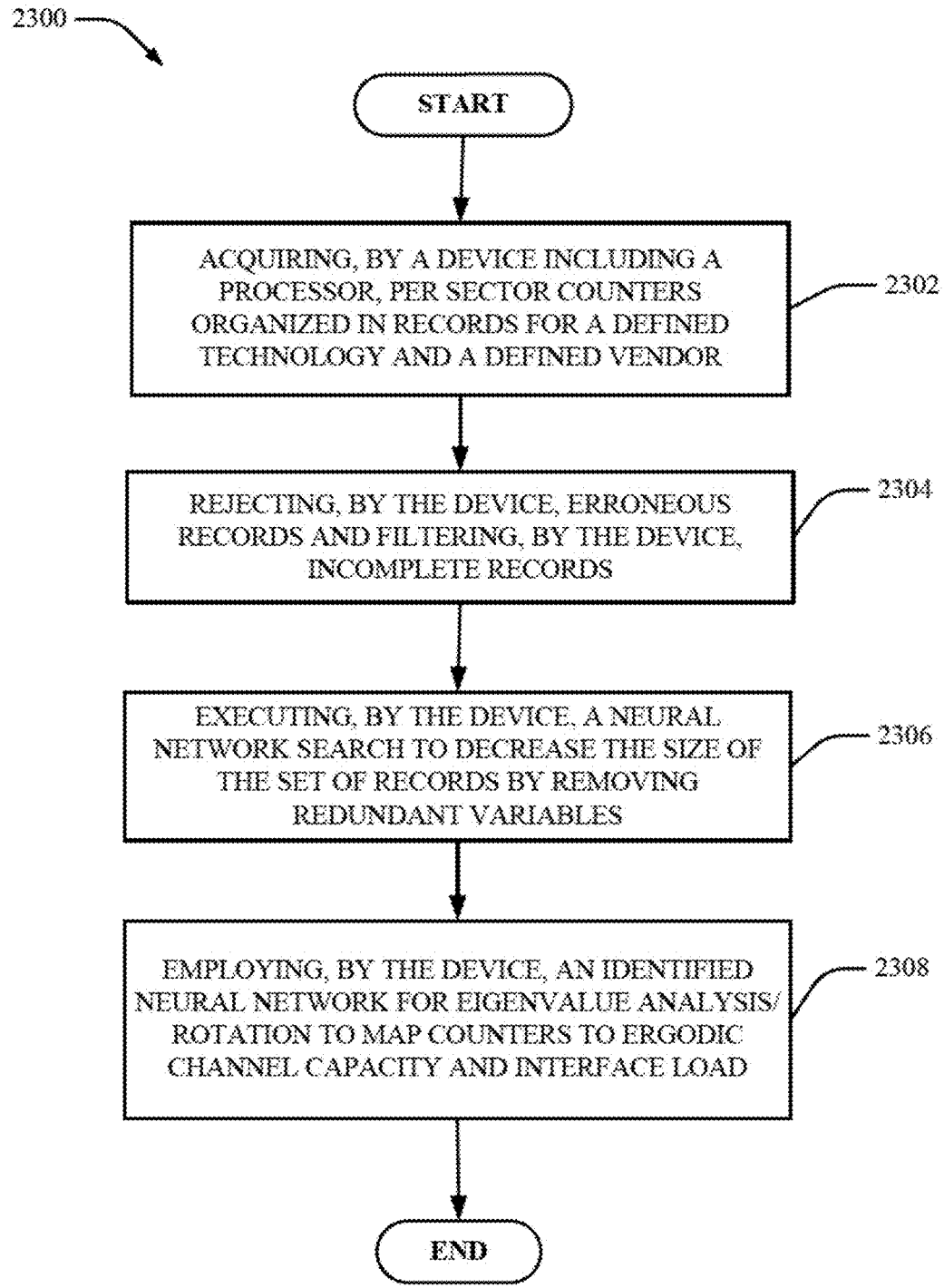

Turning now to FIG. 23, at 2302, method 2300 can include acquiring, by a device including a processor, per sector counters organized in records for a defined technology and a defined vendor. For example, with reference to FIG. 1, the device can be or include KDD-assisted multi-RAT controller 102.

At 2304, method 2300 can include rejecting, by the device, erroneous records and filtering incomplete records. At 2306, method 2300 can include executing, by the device, a neural network search to decrease the size of the set of records by removing redundant counters. At 2308, method 2300 can include employing, by the device, an identified neural network for eigenvalue analysis/rotation to map counters to capacity model counters for channel capacity and interface load.

In some embodiments, the joint conditions include a defined cell sector capacity of the RN device and a defined customer service level of the RN device. In some embodiments, the factors include an ergodic channel capacity of the RN device and an interface load of the RN device.

Figure 24:
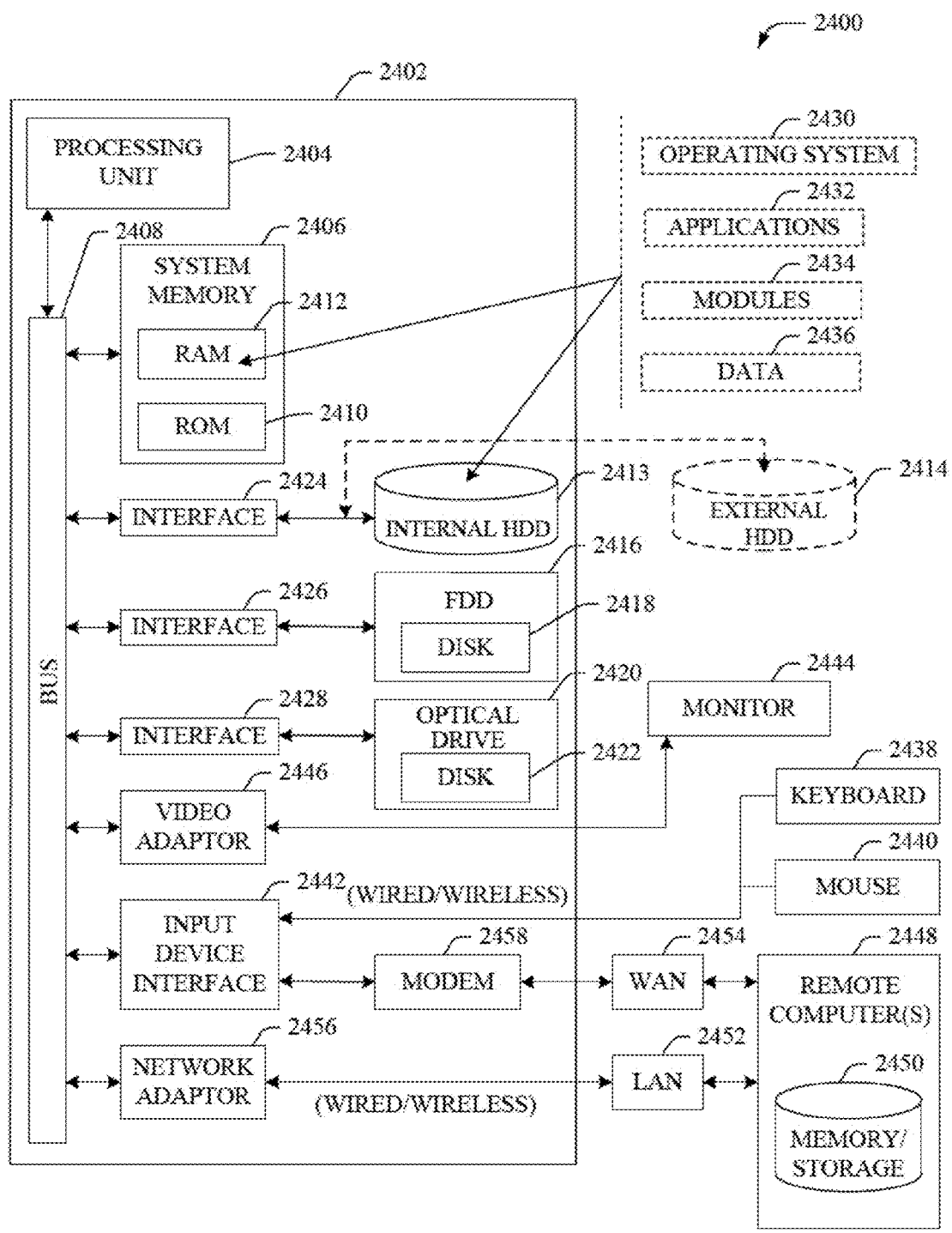
FIG. 24 illustrates a block diagram of a computer operable to facilitate monitoring and improvement of RN performance utilizing a KDD-assisted multi-RAT controller in accordance with one or more embodiments described herein.

FIG. 24 illustrates a block diagram of a computer operable to facilitate monitoring and improvement of RN performance utilizing a KDD-assisted multi-RAT controller in accordance with one or more embodiments described herein. In some embodiments, the computer can be or be included within any number of components described herein including, but are not limited to, KDD-assisted multi-RAT controller 102, computation component 308 and/or eNode Bs $110_1$, $110_2$. Repetitive description of like elements employed in respective embodiments of systems and/or apparatus described herein are omitted for sake of brevity.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the embodiments described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multiprocessor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2413 (e.g., EIDE, SATA), which internal hard disk drive 2413 can also be conFIG.d for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2420 can be connected to the system bus 2408 by a hard disk drive interface 2424, a magnetic disk drive interface 2426 and an optical drive interface, respectively. The interface 2424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

A mobile device can enter commands and information into the computer 2402 through one or more wired/wireless input devices, e.g., a keyboard 2438 and a pointing device, such as a mouse 2440. Other input devices (not shown) can include a microphone, an infrared (IR) remote control, a joystick, a game pad, a stylus pen, touch screen or the like. These and other input devices are often connected to the processing unit 2404 through an input device interface 2442 that can be coupled to the system bus 2408, but can be connected by other interfaces, such as a parallel port, an IEEE 1394 serial port, a game port, a universal serial bus (USB) port, an IR interface, etc.

A monitor 2444 or other type of display device can be also connected to the system bus 2408 via an interface, such as a video adapter 2446. In addition to the monitor 2444, a computer typically includes other peripheral output devices (not shown), such as speakers, printers, etc.

The computer 2402 can operate in a networked environment using logical connections via wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2452 through a wired and/or wireless communication network interface or adapter 2456. The adapter 2456 can facilitate wired or wireless communication to the LAN 2452, which can also include a wireless AP disposed thereon for communicating with the wireless adapter 2456.

When used in a WAN networking environment, the computer 2402 can include a modem 2458 or can be connected to a communications server on the WAN 2454 or has other means for establishing communications over the WAN 2454, such as by way of the Internet. The modem 2458, which can be internal or external and a wired or wireless device, can be connected to the system bus 2408 via the input device interface 2442. In a networked environment, program modules depicted relative to the computer 2402 or portions thereof, can be stored in the remote memory/storage device 2450. It will be appreciated that the network connections shown are example and other means of establishing a communications link between the computers can be used.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be conFIG.d via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
accessing, by a device comprising a processor, first counters for a radio network device, wherein the first counters are associated with a joint condition for the radio network device;
employing, by the device, pattern recognition to reduce the first counters to second counters fewer than the first counters, wherein the second counters are associated with the joint condition for the radio network device; and
determining, by the device, a factor associated with the joint condition, wherein the determining is based on the second counters.

2. The method of claim 1, wherein the factor comprises an ergodic channel capacity of the radio network device, and wherein the ergodic channel capacity and an interface load of the radio network device are associated with a defined strategic performance index indicative of the performance of the radio network device.

3. The method of claim 1, further comprising determining the joint condition for the radio network device, wherein the joint condition is associated with a performance requirement for the radio network device.

4. The method of claim 1, further comprising filtering a group of records within a counter of the first group of counters to remove malformed records of the group of records.

5. The method of claim 4, wherein the filtering comprises performing a time series filtering method on the malformed records to recover correct data and generate new records based on the correct data.

6. The method of claim 5, further comprising mapping the new records to the ergodic channel capacity and the interface load based on performing eigenvalue analysis on information indicative of the new records.

7. The method of claim 1, wherein the employing pattern recognition comprises employing a machine learning analysis.

8. An apparatus, comprising:
a memory to store executable instructions; and
a processor, coupled to the memory, that facilitates execution of the executable instructions to perform operations, comprising:
accessing a first group of counters for a radio network device, wherein the first group of counters is associated with a joint condition for the radio network device;
employing pattern recognition to reduce the first group of counters to a second group of counters, wherein the second group of counters is associated with the joint condition for the radio network device; and
determining a factor associated with the joint condition, wherein the determining is based on the second group of counters.

9. The apparatus of claim 8, wherein the joint condition comprises a defined cell sector capacity of the radio network device.

10. The apparatus of claim 8, wherein the factor comprises an interface load of the radio network device.

11. The apparatus of claim 8, wherein the operations further comprise determining the joint condition for the radio network device.

12. The apparatus of claim 11, wherein the joint condition is associated with a performance requirement for the radio network device, and wherein the performance requirement is a defined customer service level for the radio network device.

13. The apparatus of claim 8, wherein the pattern recognition comprises a data mining analysis.

14. The apparatus of claim 13, wherein the data mining analysis comprises a neural network analysis.

15. The apparatus of claim 13, wherein the data mining analysis comprises a machine learning analysis.

16. The apparatus of claim 8, wherein the employing pattern recognition to reduce the first group of counters to the second group of counters comprises employing eigenvalue analysis to map the first group of counters to capacity model counters for channel capacity and interface load.

17. A non-transitory machine-readable storage medium, comprising executable instructions that, when executed by a processor, facilitate performance of operations, comprising:
    accessing first counters for a radio network device, wherein the first counters are associated with a joint condition for the radio network device;
    employing pattern recognition to reduce the first counters to second counters, wherein the second counters are associated with the joint condition for the radio network device, and wherein the employing the pattern recognition comprises determining information indicative of a pattern associated with a defined relationship between an ergodic channel capacity of the radio network device, an interface load of the radio network device and a defined strategic performance index associated with the performance of the radio network device; and
    determining a factor associated with the joint condition, wherein the determining is based on the second counters.

18. The non-transitory machine-readable storage medium of claim 17, wherein the pattern recognition comprises a data mining analysis.

19. The non-transitory machine-readable storage medium of claim 18, wherein the data mining analysis comprises a neural network analysis.

20. The non-transitory machine-readable storage medium of claim 17, wherein the joint condition comprises a defined cell sector capacity of the radio network device.

* * * * *